United States Patent
Sano et al.

(10) Patent No.: US 6,761,244 B2
(45) Date of Patent: Jul. 13, 2004

(54) ELECTRIC POWER STEERING APPARATUS

(75) Inventors: Osamu Sano, Kashihara (JP); Hiroto Sasaki, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/355,938

(22) Filed: Jan. 31, 2003

(65) Prior Publication Data

US 2003/0146039 A1 Aug. 7, 2003

(30) Foreign Application Priority Data

Feb. 4, 2002 (JP) ........................... 2002-027008
Mar. 6, 2002 (JP) ........................... 2002-060596

(51) Int. Cl.⁷ ................................................. B62D 5/04
(52) U.S. Cl. ..................................................... 180/444
(58) Field of Search ............................ 180/443, 444, 180/446; 310/75 R

(56) References Cited

U.S. PATENT DOCUMENTS

| | | | |
|---|---|---|---|
| 3,851,538 A | 12/1974 | Denkowski et al. | 74/425 |
| 5,027,024 A | 6/1991 | Slayton | 310/90 |
| 5,454,438 A | 10/1995 | Chikuma | 180/79.1 |
| 5,921,344 A * | 7/1999 | Boyer | 180/444 |
| 5,971,094 A * | 10/1999 | Joshita | 180/444 |
| 6,044,723 A | 4/2000 | Eda et al. | 74/388 PS |
| 6,431,601 B2 * | 8/2002 | Maekawa | 280/777 |
| 6,460,650 B2 * | 10/2002 | Tsuboi et al. | 180/444 |
| 6,491,131 B1 * | 12/2002 | Appleyard | 180/444 |
| 6,516,915 B2 * | 2/2003 | Kurokawa et al. | 180/444 |
| 6,609,588 B2 * | 8/2003 | Mielke et al. | 180/444 |
| 6,644,431 B2 * | 11/2003 | Kuze et al. | 180/444 |
| 6,659,219 B2 * | 12/2003 | Okada et al. | 180/444 |
| 2003/0188918 A1 * | 10/2003 | Shimizu et al. | 180/444 |

FOREIGN PATENT DOCUMENTS

| | | | |
|---|---|---|---|
| DE | 40 39 453 | 6/1992 | |
| DE | 196 52 929 | 6/1998 | |
| EP | 1139545 | 10/2001 | |
| JP | 56-73221 | * 6/1981 | ........... F16C/19/52 |
| JP | 11-43062 | 2/1999 | |
| JP | 2001-355700 | 12/2001 | |

* cited by examiner

Primary Examiner—Avraham Lerner
(74) Attorney, Agent, or Firm—Darby & Darby

(57) ABSTRACT

An electric power steering apparatus includes a rolling bearing 9 for supporting rotatably a worm 6 that is rotated by a steering assisting electric motor 5; a first resilient portion 21 which is disposed in contact with the inner circumference of an inner ring 9b of the rolling bearing 9 and held on the worm 6 so that it is extendable by a force in an axial direction applied to the worm 6; and two resilient members 22 and 23, held in contact with both ends of the inner ring 9b, for restraining the movement of the worm 6 in the axial direction. Even when the electric power steering apparatus has a single rolling bearing, the worm 6 is moved in the axial direction by a steering force transmitted to the worm 6 from a worm wheel 7 in a steering range in which the motor 5 is not driven, and the steering load in the steering range in which the motor 5 is not driven is decreased.

17 Claims, 11 Drawing Sheets

ELECTRIC POWER STEERING APPARATUS

BACKGROUND OF THE INVENTION

1. Field of the Invention

The present invention relates to an electric power steering apparatus using an electric motor as a source for generating a steering assist force.

2. Description of Related Art

An electric power steering apparatus for vehicles is, for example, constructed so as to detect steering torque applied to an input shaft, based on a relative angular displacement between the input shaft connected to a steering wheel and an output shaft connected coaxially to the input shaft through a torsion bar, to drive a steering force assisting electric motor based on the detected torque, and to transmit the torque of this motor to a steering mechanism through a reduction gear mechanism. In such a structure, the operation of the steering mechanism corresponding to the rotation of the steering wheel is assisted by the rotation of the electric motor, and the labor of a driver for steering is reduced.

The reduction gear mechanism comprises a worm coupled to the driving shaft of the steering assisting electric motor, and a worm wheel meshed with this worm. This worm wheel is fitted and fixed at a midway point of a transmission path running from the output shaft to the steering mechanism.

Further, both ends of the worm are supported by a pair of rolling bearings to improve the rotating performance of the worm. However, the rolling bearing has a thrust clearance between an inner ring and outer ring fitted with a plurality of rolling elements therebetween, and it is necessary to eliminate the thrust clearance for the following reasons. Specifically, it is necessary to eliminate the thrust clearance because the thrust clearance of the rolling bearing causes a backlash of the worm in the axial direction, and abnormal noise caused by the backlash leaks into the room of a vehicle and makes the driver uncomfortable.

For such reasons, there is provided a screw ring which is in contact with one end of the outer ring of one rolling bearing supporting one end of the worm and capable of being turned. By turning this screw ring, the outer ring and inner ring of the one rolling bearing are moved relatively in the axial direction, and also the inner ring and outer ring of the other rolling bearing are moved relatively in the axial direction through the worm, thereby eliminating the thrust clearance and backlash of the worm in the axial direction.

By the way, the worm of the electric power steering apparatus constructed as described above is supported so that the worm can not move in the axial direction relative to the rolling bearings that support both ends thereof. Therefore, in the case where the electric power steering apparatus is constructed so that the electric motor is rotated from an early stage of steering and steering is assisted by turning the steering wheel in the left or right direction from the steering neutral position, the steering assist is provided even when the steering wheel is turned at a small angle of around 1° during driving of the vehicle at high speed, causing a reduction in the steering feeling. For this reason, in general, the electric power steering apparatus is constructed so that the electric motor is not driven when the steering angle is as small as around but is driven when the steering angle exceeds a suitable steering angle.

In such a structure where the electric motor is not driven until the steering angle exceeds a suitable angle, however, in a steering range in which the electric motor is not driven, i.e., steering in a range near the steering neutral position, the steering force of the steering wheel is transmitted to the driving shaft of the electric motor through the input shaft, torsion bar, output shaft, worm wheel and worm sequentially, and consequently the driving shaft is rotated. As a result, load to rotate the driving shaft of the electric motor is applied to the steering wheel through the worm, worm wheel, output shaft, torsion bar and input shaft sequentially, and the steering load increases.

By the way, in order to decrease the steering load in the steering range in which the electric motor is not driven, for example, there is a known technique disclosed in Japanese Patent Application Laid-Open No. 11-43062 (1999). More specifically, this technique adopts a structure where two rolling bearings separated in the axial direction support the worm coupled to the driving shaft of the electric motor so that the worm is movable in the axial direction, two plate springs are provided between the worm and the inner rings of the two rolling bearings, and the inner rings are forced in the axial direction relative to the outer rings by the elastic restoring force of the plate springs. Accordingly, it is possible to eliminate the thrust clearances of the rolling bearings and restrain the movement of the worm in both directions along the axial direction, thereby solving the above problems.

In this structure, when the steering force of the steering wheel is transmitted from the worm wheel to the worm by steering in a steering range in which the electric motor is not driven, the worm overcomes the elastic restoring force of the plate springs by a component force applied to the worm in the axial direction and moves in the axial direction, the rotation angle of the worm becomes smaller, and the transmission power from the worm to the driving shaft of the electric motor is reduced.

However, in the structure as disclosed in the Japanese Patent Application Laid-Open No. 11-43062 (1999), two rolling bearings and two plate springs are necessary to eliminate the thrust clearances of the rolling bearings, resulting in a complicated structure.

Moreover, since the plate springs for restraining the movement of the worm in both directions along the axial direction also perform the function of eliminating the thrust clearances of the rolling bearings, the elastic restoring force of the plate springs needs to be set relatively high, and accordingly the effect of reducing the steering load in the steering range in which the electric motor is not driven is reduced.

BRIEF SUMMARY OF THE INVENTION

The present invention has been made with the aim of solving the above problems, and it is an object of the present invention to provide an electric power steering apparatus capable of decreasing a steering load in a steering range in which a steering assisting electric motor is not driven, even when the electric power steering apparatus comprises a single rolling bearing for supporting a worm which is rotated by the steering assisting electric motor.

An electric power steering apparatus according to the first aspect of the present invention comprising a worm that is rotated by a steering assisting electric motor, bearing means for supporting the worm, and a worm wheel which meshes with the worm and is connected to a steering mechanism, for assisting steering by the rotation of the electric motor, characterized in that the bearing means comprises: a rolling bearing with an inner ring into which a shaft portion on one end side of the worm is inserted, for supporting the worm rotatably; a first resilient member disposed in contact with an inner circumference of the inner ring of the rolling bearing, and capable being extended in a axial direction of the worm by a force applied to the worm in the axial direction; and two second resilient members for restraining a movement of the worm in the axial direction, the second resilient members being held on the worm or the inner ring so as to be in contact with both ends of the inner ring of the rolling bearing.

In the electric power steering apparatus of the first aspect of the present invention, the first resilient member is in contact with the inner circumference of the inner ring of one rolling bearing, and the second resilient members are in contact with both ends of the inner ring of the rolling bearing. Therefore, with a force in the axial direction applied to the worm when steered in either the left or right direction from a steering neutral position, the first resilient member is extended, and either of the second resilient members is also bent. As a result, even when the bearing means for supporting the worm comprises a single rolling bearing, it is possible to decrease the steering load in a steering range in which the electric motor is not driven. Moreover, since the load generated by the worm is shared by the first resilient member and the second resilient members, it is possible to improve the durability of the first resilient member and the second resilient members, and the electric power steering apparatus can be used over a long period of time.

An electric power steering apparatus according to the second aspect of the present invention is based on the first aspect, and characterized in that the first resilient member and the second resilient members are formed integrally as a movement-restraining member.

According to the electric power steering apparatus of the second aspect of the present invention, in the first aspect, the positions of the first resilient member and the second resilient members can be maintained by holding the first resilient member on the worm, and it is thus possible to omit a process for holding the first resilient member and second resilient members. Further, it is possible to assemble the first resilient member and two second resilient members by an operation for holding the first resilient member on the worm, i.e., by a single operation. Therefore, although the electric power steering apparatus comprises the first resilient member and two second resilient members, it is possible to improve the efficiency of the assembling operation and reduce the cost of the electric power steering apparatus.

An electric power steering apparatus according to the third aspect of the present invention is based on the first or second aspect, and characterized in that one of the second resilient members has a smaller movement restraining force in the axial direction of the worm than the other.

According to the electric power steering apparatus of the third aspect of the present invention, in the first or second aspect, with a force in the axial direction applied to the worm when steered in either the left or right direction from the steering neutral position, the first resilient member is extended and one of the second resilient members is bent. Moreover, since one of the second resilient members has a smaller movement restraining force in the axial direction of the worm, it can be easily mounted on the worm, and the steering load in a steering range in which the electric motor is not driven can be decreased. Furthermore, by forming the first resilient member and second resilient members integrally, the second resilient member prevents the first resilient members from coming out of the inner ring, thereby making it possible to maintain the first resilient member and second resilient members in appropriate positions over a long period of time.

Besides, in the third aspect, when both end portions of the worm are supported by rolling bearings and the first resilient member and second resilient members are provided between the worm and the inner rings of the two rolling bearings, it is possible to equalize the forces for restraining the movement of the worm with respect to a certain steering angle in the left and right directions from the steering neutral position, thereby improving the steering feeling.

Further, in this case, since the first resilient member can be held by being fitted on the worm, it is possible to eliminate a process for holding the first resilient member. In addition, the second resilient members can be assembled with the operation for holding the first resilient member, i.e., the first resilient member and second resilient members can be assembled simultaneously by a single operation. Therefore, although this structure comprises the first resilient member and two second resilient members, it is possible to improve the efficiency of the assembling operation and reduce the cost of the electric power steering apparatus.

An electric power steering apparatus according to the fourth aspect of the present invention is based on the first or second third aspect, and characterized in that the first resilient member comprises: a cylindrical portion; and an annular projecting portion projecting in a radial direction of the worm, on an outer circumference of the cylindrical portion.

According to the electric power steering apparatus of the fourth aspect of the present invention, in the first or second aspect, with the application of a force in the axial direction to the worm, the cylindrical portion is extended and the annular projecting portion on the outer circumference of the cylindrical portion is also extended. It is therefore possible to gradually decrease the steering load in a steering range in which the electric motor is not driven and further improve the steering feeling.

An electric power steering apparatus according to the fifth aspect of the present invention is based on the first or second aspect, and characterized by comprising a ring member between an inner circumference of the first resilient member and the worm.

According to the electric power steering apparatus of the fifth aspect of the present invention, in the first or second aspect, the ring member can be fitted and held on the worm without bringing the first resilient member into contact with the worm, and therefore the first resilient member and second resilient members can be assembling more easily.

An electric power steering apparatus according to the sixth aspect of the present invention is based on the first aspect, and characterized in that the first resilient member and the second resilient members are O rings.

According to the electric power steering apparatus of the sixth aspect of the present invention, in the first aspect, ready made O rings can be used as the first resilient member and the second resilient members, and therefore it is possible to reduce the costs of the first resilient member and second resilient members and consequently the cost of the electric power steering apparatus.

An electric power steering apparatus according to the seventh aspect of the present invention is based on the first aspect, and characterized in that the bearing means comprises: a rolling bearing with an inner ring into which a shaft portion on one end side of the worm is inserted for supporting the worm rotatably, and for supporting the worm so that the worm is movable in the axial direction; forcing means for forcing the inner ring of the rolling bearing in the axial direction of the worm; and resilient members for restraining a movement of the worm in both directions along the axial direction in a state in which a movement of the inner ring of the rolling bearing due to the forcing means is stopped.

According to the electric power steering apparatus of the seventh aspect of the present invention, in the first aspect, the forcing means forces the inner ring of the rolling bearing in the axial direction, and therefore it is possible to eliminate the thrust clearance of the rolling bearing. Moreover, since the resilient members for restraining the movement of the worm in both directions along the axial direction restrain the movement of the worm in the axial direction in a state in which the movement of the inner ring of the rolling bearing due to the forcing means is stopped, the thrust clearance of the rolling bearing supporting the worm can be eliminated, and further the elastic restoring force of the resilient member can be set irrespective of the forcing means. It is therefore possible to decrease the steering load in a steering range in which the electric motor is not driven, equalize the bent amounts of the resilient members with respect to a certain steering angle in the left and right directions from the steering neutral position, and improve the steering feeling.

An electric power steering apparatus according to the eighth aspect of the present invention is based on the seventh aspect, and characterized in that the bearing means comprises a sliding bearing into which the other end portion of the worm is inserted.

According to the electric power steering apparatus of the eighth aspect of the present invention, in the seventh aspect, although it is possible to eliminate the thrust clearance of the rolling bearing and decrease the steering load in a steering range in which the electric motor is not driven, the cost of the bearing means and consequently the cost of the electric power steering apparatus can be reduced compared to the structure using two rolling bearings, and further the size and weight of the worm supporting portion can be decreased.

An electric power steering apparatus according to the ninth aspect of the present invention is based on the seventh or eighth aspect, and characterized in that the resilient members are positioned in contact with a ring member provided on the bearing means and the worm, respectively.

According to the electric power steering apparatus of the ninth aspect of the present invention, in the seventh or eighth aspect, the resilient members can be positioned without being affected by the position of the rolling bearing, and therefore it is possible to increase the flexibility in design and easily meet the demand of the users.

An electric power steering apparatus according to the tenth aspect of the present invention is based on the ninth aspect, and characterized in that the ring member is the inner ring.

According to the electric power steering apparatus of the tenth aspect of the present invention, in the ninth aspect, the positions of the resilient members can be maintained by the inner ring of one rolling bearing that supports one end portion of the worm, and therefore it is possible to further simplify the structure and further reduce the cost.

An electric power steering apparatus according to the eleventh aspect of the present invention is based on the eighth aspect, and characterized in that the resilient members are held on the worm, the sliding bearing, or a ring member so that the resilient members are positioned on both end portions of the sliding bearing and/or both end portions of the ring member which supports the sliding bearing.

According to the electric power steering apparatus of the eleventh aspect of the present invention, in the eighth aspect, the positions of the resilient members can be maintained by one sliding bearing that supports the other end side of the worm, and therefore it is possible to further simplify the structure and further reduce the cost.

An electric power steering apparatus according to the twelfth aspect of the present invention is based on the first or seventh aspect, and characterized in that said worm is capable of being tilted about a portion supported by said rolling bearing, and pushing means for pushing said worm toward said worm wheel is further provided.

According to the electric power steering apparatus of the twelfth aspect of the present invention, in the first or seventh aspect, by pushing the worm toward the worm wheel by the pushing means, it is possible to adjust the distance between the centers of rotation of the worm and worm wheel, and decrease the amount of backlash in the meshing portion of the worm and worm wheel.

The above and further objects and features of the invention will more fully be apparent from the following detailed description with accompanying drawings.

DETAILED DESCRIPTION OF THE PREFERRED EMBODIMENTS

The following description will explain the present invention in detail based on the drawings illustrating preferred embodiments thereof.

First Embodiment

Figure 1:
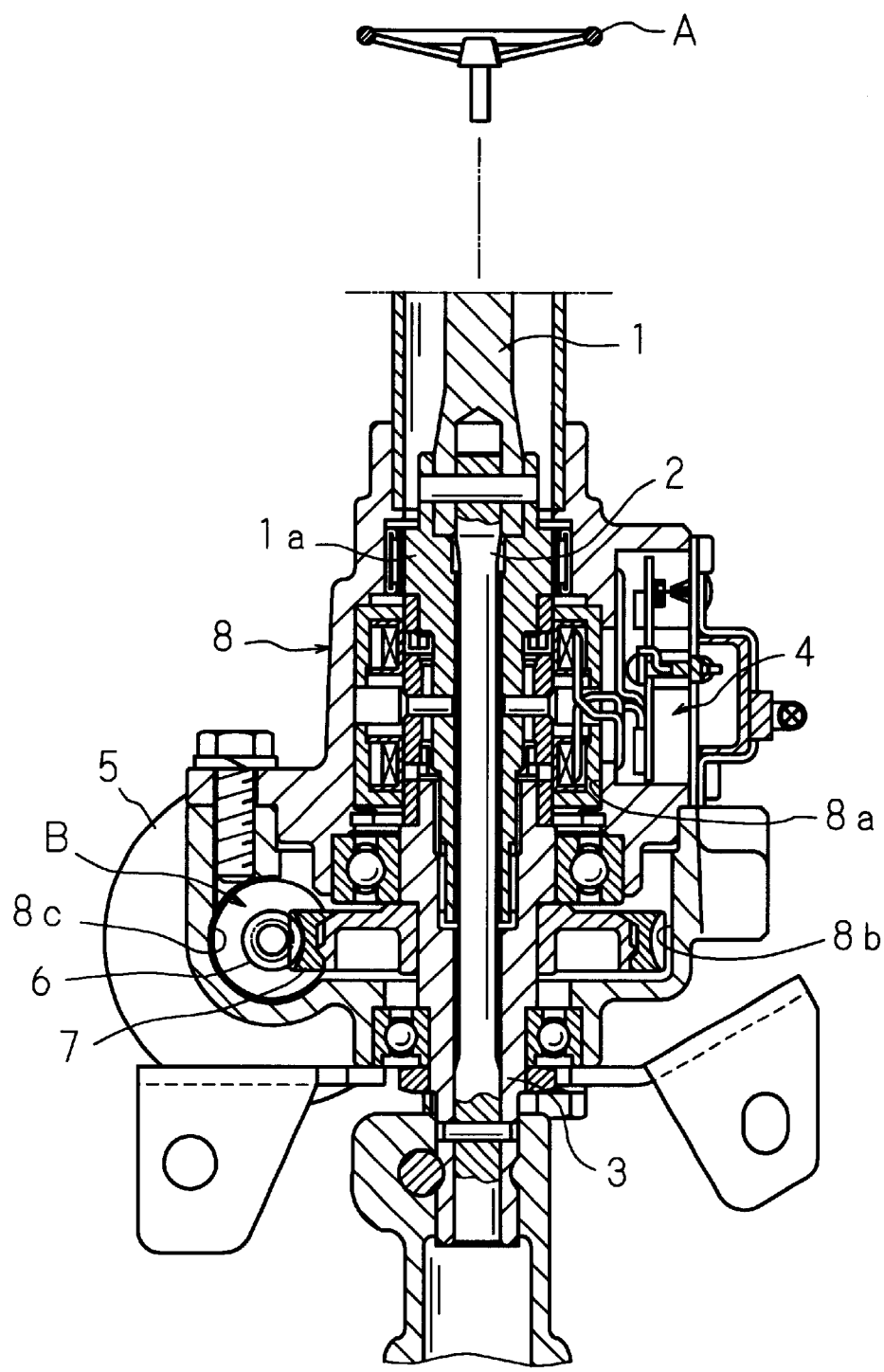
FIG. 1 is a cross sectional view showing the structure of the first embodiment of an electric power steering apparatus of the present invention.

FIG. 1 is a cross sectional view showing the structure of the first embodiment of an electric power steering apparatus of the present invention.

The electric power steering apparatus comprises an input shaft 1 having an upper end connected to a steering wheel A for steering and a cylindrical portion 1a in its lower end; a torsion bar 2 which is inserted into the cylindrical portion 1a so that its upper end is coaxially connected to the cylindrical portion 1a of the input shaft 1, and twisted by the function of steering torque applied to the steering wheel A; an output shaft 3 having a lower end coaxially connected to the lower end of the torsion bar 2; a torque sensor 4 for detecting steering torque applied to the steering wheel A, based on a relative rotational displacement between the input shaft 1 and the output shaft 3 corresponding to a twist of the torsion bar 2; a steering force assisting electric motor 5 which is driven based on the torque detected by the torque sensor 4; a reduction gear mechanism B including a worm 6 and a worm wheel 7, which is linked with a rotation of the motor 5, reduces the speed of the rotation of the motor 5 and then transmits the rotation to the output shaft 3; and a housing 8 in which the torque sensor 4 and the reduction gear mechanism B are housed.

The housing 8 comprises a first housing portion 8a housing the torque sensor 4; a second housing portion 8b which is connected to the first housing portion 8a and houses the worm wheel 7; and a third housing portion 8c which is connected to the second housing portion 8b and houses the worm 6.

Figure 2:
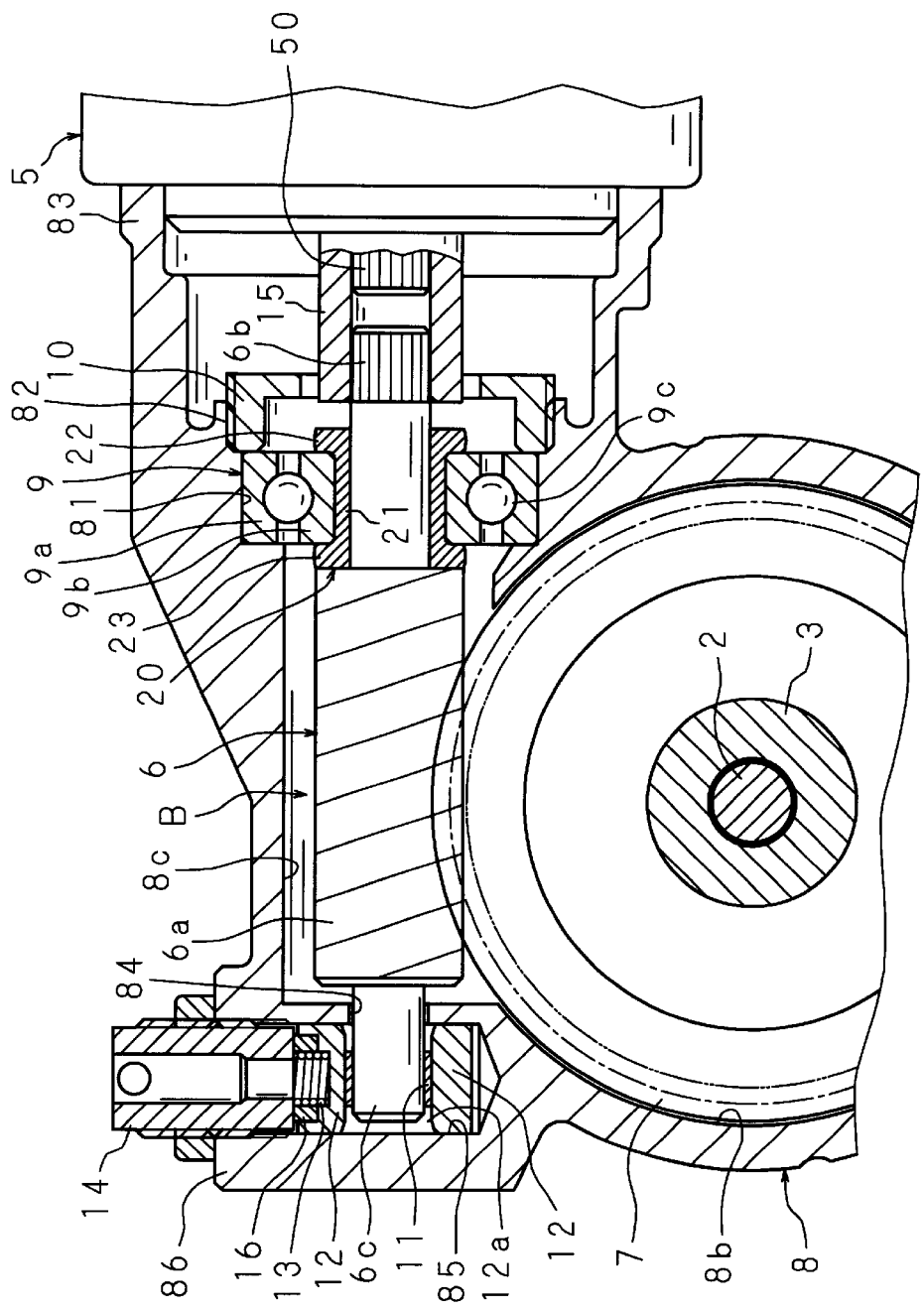
FIG. 2 is a cross sectional view showing the structure of the reduction gear mechanism section of the first embodiment of an electric power steering apparatus of the present invention.

FIG. 2 is a cross sectional view showing the structure of the reduction gear mechanism section of the first embodiment of the electric power steering apparatus of the present invention.

The third housing portion 8c is elongated in the axial direction of the worm 6, and one end portion in the longitudinal direction thereof is open, while the other end portion is closed. On one end portion of the third housing portion 8c, there are provided a fitting hole 81 into which a rolling bearing 9 is to be fitted, a screw hole 82 connected to one end portion of the fitting hole 81, and a motor mounting portion 83 connected to the screw hole 82. Then, an outer ring 9a of the rolling bearing 9 is fitted into the fitting hole 81, and a screw ring 10 in contact with one end of the outer ring 9a is screwed into the screw hole 82. This screw ring 10 restrains the movement of the rolling bearing 9 in the axial direction. In addition, the motor 5 is mounted on the motor mounting portion 83.

Further, provided integrally on the other end portion of the third housing portion 8c of the housing 8 are a concave hole 84 into which a shaft portion 6c provided on the other end portion of the worm 6 is inserted, and a guide member 86 having a cylindrical guide hole 85 formed in a radial direction of the worm 6 to face the inner surface of the concave hole 84. In this guide hole 85, there are housed a pushing member 12 which has a sliding bearing 11 and is movable in a radial direction, and a resilient member 13 functioning as forcing means for forcing the pushing member 12 in one direction. Moreover, an operating member 14 for moving the pushing member 12 through the resilient member 13 is screwed into an outside opening edge side of the guide hole 85.

The reduction gear mechanism B comprises the worm 6 coupled to a driving shaft 50 of the motor 5 through a cylindrical shaft coupling 15, and the worm wheel 7 which is fitted and fixed on a midway point of the output shaft 3 and connected to a steering mechanism. The speed of rotation of the driving shaft 50 is reduced by the meshing of the worm 6 and the worm wheel 7 and transmitted to the output shaft 3, and then transmitted from the output shaft 3 to a lack-and-pinion steering mechanism (not shown), for example, through a universal joint.

The worm 6 is disposed to cross the shaft axis of the output shaft 3, and comprises shaft portions 6b and 6c on both ends of a tooth portion 6a having a plurality of lines of teeth. The shaft portion 6b on one end portion of the worm 6 is rotatably supported in the fitting hole 81 through a later-described movement-restraining member 20 and the rolling bearing 9. The shaft portion 6c on the other end portion of the worm 6 is inserted into the sliding bearing 11 from the concave hole 84 so that it is movable in the axial direction, and is rotatably supported by the pushing member 12 through the sliding bearing 11.

The rolling bearing 9 for supporting the shaft portion 6b on one end side of the worm 6 is composed of the outer ring 9a, inner ring 9b, and a plurality of rolling elements 9c interposed between the outer ring 9a and the inner ring 9b.

The movement-restraining member 20 made of rubber for restraining the movement of the worm 6 in the axial direction is fitted and held on the shaft portion 6b on one end side of the worm 6 supported rotatably by the rolling bearing 9 and the sliding bearing 11. This movement-restraining member 20 is composed of a cylindrical first resilient portion 21 in contact with the inner circumference of the inner ring 9b of the rolling bearing 9 and two ring-shaped second resilient portions 22, 23 which are molded integrally on both ends of the first resilient portion 21 and in contact with both ends of the inner ring 9b of the rolling bearing 9. The first resilient portion 21 is fitted and held on the shaft portion 6b on one end side of the worm 6. The second resilient portion 23 is positioned between the tooth portion 6a of the worm 6 and the inner ring 9b so that the second resilient member 23 is in contact with one end of the tooth portion 6a. Note that the first resilient portion 21 forms a first resilient member, and the second resilient portions 22 and 23 form second resilient members.

When a force in the axial direction is applied to the worm 6, the first resilient portion 21 is extended with its outer circumference being in contact with the inner circumference of the inner ring 9b of the rolling bearing 9. Besides, when a force in either direction along the axial direction is applied to the worm 6, the second resilient members 22 and 23 are bent in either direction along the axial direction of the worm 6. Such a extension of the first resilient portion 21 and bending of the second resilient portions 22, 23 restrain the movement of the worm 6 in the axial direction relative to the inner ring 9b of the rolling bearing 9.

Further, the pushing member 12 for supporting the shaft portion 6c on the other end side of the worm 6 through the sliding bearing 11 is formed in a cylindrical shape with an outside diameter substantially equal to the inside diameter of the guide hole 85. At the middle position in the axial direction of this pushing member 12, that is, a midway point in the direction of movement along the guide hole 85, there is a fitting hole 12a pierced orthogonally to the moving direction of the pushing member 12, and the sliding bearing 11 is fitted and fixed in this fitting hole 12a.

Besides, the resilient member 13 interposed between the pushing member 12 and the operating member 14 is made of a coil spring. This resilient member 13 forces the pushing member 12 in the moving direction thereof so as to apply a pre-pressure to the meshing portion of the worm 6 with the worm wheel 7. Moreover, a ring-shaped resilient plate 16 made from synthetic rubber, for example, is mounted on the outer circumference between the pushing member 12 and the operating member 14 of the resilient member 13. Accordingly, when the resilient member 13 is bent by a predetermined dimension by a rotating operation of the operating member 14, an end face of the operating member 14 comes into contact with the other face of the resilient plate 16, and the resilient plate 16 is bent together with the resilient member 13.

The electric power steering apparatus of the first embodiment of the present invention constructed as described above supports rotatably the shaft portion 6b on one end side of the worm 6 coupled to the driving shaft 50 of the motor 5 through the shaft coupling 15 by the rolling bearing 9, and supports rotatably the shaft portion 6c on the other end side by the sliding bearing 11. Further, since the first resilient portion 21 of the movement-restraining member 20 is fitted and held on the shaft portion 6b on one end side of the worm 6 supported by the rolling bearing 9, the first resilient portion 21 and the second resilient portions 22, 23 formed integrally on both ends of the first resilient portion 21 restrain the movement of the worm 6 in the axial direction. Therefore, the steering force of the steering wheel A when steered in a steering range in which the motor 5 is not driven, i.e., the steering range in which the steering angle during high-speed driving of a vehicle is as small as around 10, for example, is transmitted to the worm 6 through the input shaft 1, torsion bar 2, output shaft 3 and worm wheel 7. With a component force applied in the axial direction of this worm 6, the worm 6 moves in one direction along the axial direction while extending the first resilient portion 21 and bending the second resilient portion 23, or it moves in the other direction along the axial direction while extending the first resilient portion 21 and bending the second resilient portion 22. With this movement of the worm 6 in the axial direction, the rotation angle of the worm 6 becomes smaller than an intended angle corresponding to the rotation angle of the worm wheel 7, thereby reducing the transmission power from the worm 6 to the driving shaft 50 of the motor 5 and decreasing the steering load in a steering range in which the motor 5 is not driven.

In addition, one of the second resilient portions, 23 (or 22), reduces the force in one direction (or the other direction) along the axial direction applied to the worm 6, and the other second resilient portion 22 (or 23) reduces the force in the other direction (or one direction) along the axial direction. It is therefore possible to equalize the bent amounts of the second resilient portions 22 and 23 with respect to a steering angle within a certain range in both the left and right directions from the steering neutral position, and improve the steering feeling.

Besides, since the force in the axial direction applied to the worm 6 is shared by the first resilient portion 21 and the second resilient portions 22, 23, it is possible to improve the durability of the first resilient portion 21 and the second resilient portions 22, 23, and increase the mechanical life.

Furthermore, since the shaft portion 6c on the other end side of the worm 6 is supported through the sliding bearing 11 by the pushing member 12 forced by the resilient member 13, the resilient member 13 forces the worm 6 toward the worm wheel 7. Accordingly, the distance between the centers of rotation of the worm 6 and worm wheel 7 can be adjusted, and therefore the amount of backlash in the meshing portion of the worm 6 and worm wheel 7 can be decreased.

Second Embodiment

Figure 3:
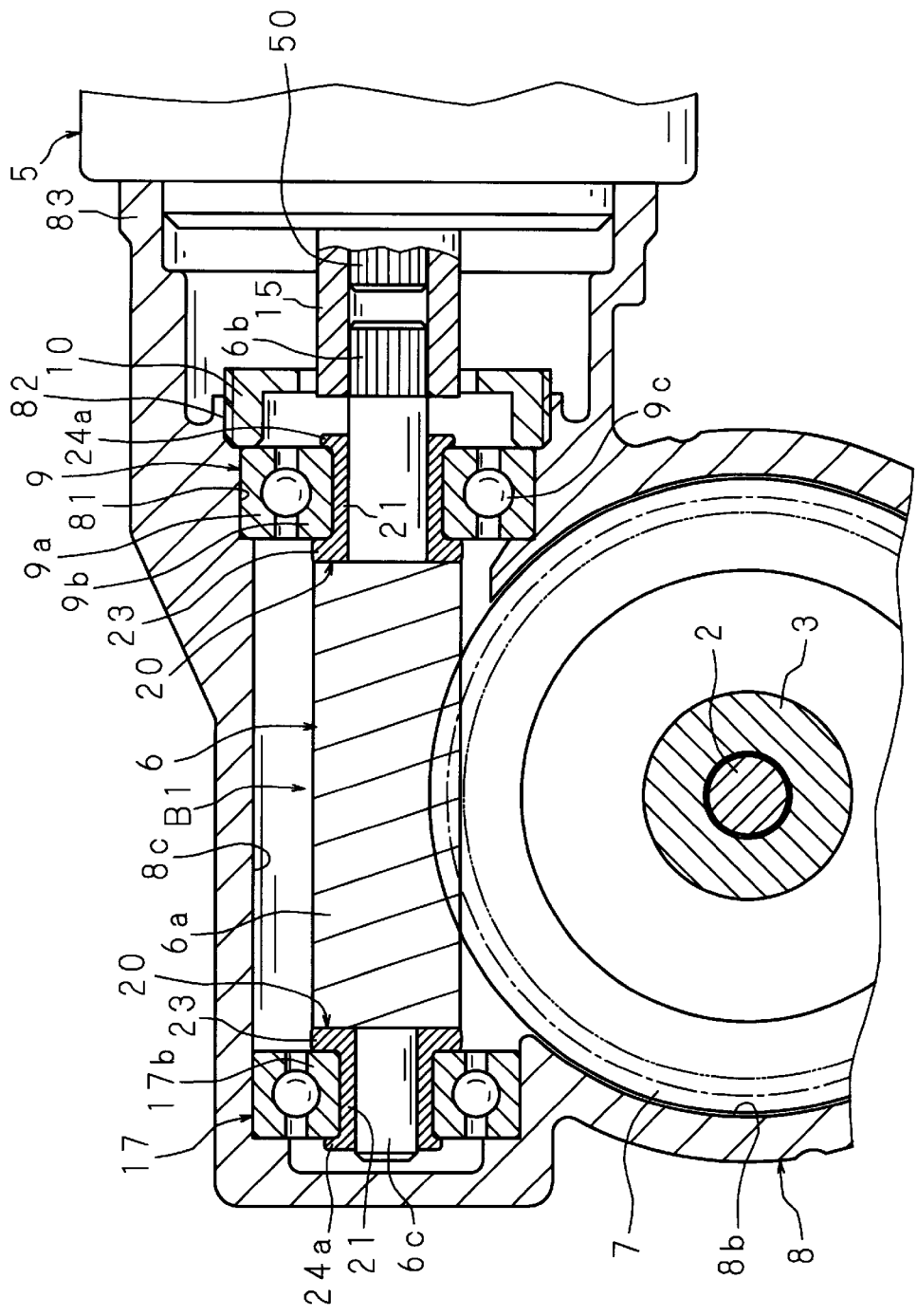
FIG. 3 is a cross sectional view showing the structure of the reduction gear mechanism section of the second embodiment of an electric power steering apparatus of the present invention.

FIG. 3 is a cross sectional view showing the structure of the reduction gear mechanism section of the second embodiment of an electric power steering apparatus of the present invention.

Unlike the first embodiment in which the second resilient portions 22 and 23 having substantially equal size are integrally provided on both end portions of the first resilient portion 21, the electric power steering apparatus of the second embodiment includes a small portion 24a whose force for restraining the movement of the worm 6 in the axial direction is smaller than that of the second resilient portion 23, in place of the second resilient portion 22 located on the outer side in the axial direction. Note that the small portion 24a is integrally provided on the first resilient portion 21 together with the second resilient portion 23.

In the second embodiment, the second resilient portion 23 is made thick and large so that, when a force in the axial direction is applied to the worm 6, the second resilient portion 23 is bent in the axial direction and thereby restrains the movement of the worm 6 in the axial direction. On the other hand, the small portion 24a is made thin and small to such an extent that, when the first resilient portion 21 is extended by the application of a force in the axial direction to the worm 6, the small portion 24a is bent in the axial direction and thereby prevents the first resilient portion 21 from coming out of the inner ring 9b of the rolling bearing 9.

The movement-restraining member 20 formed integrally by the first resilient portion 21, second resilient portion 23 and small portion 24a constructed as described above is used, for example, as shown in FIG. 3, for the portions of both rolling bearings 9 and 17 of the reduction gear mechanism B1 in which the shaft portions 6b and 6c on both end portions of the worm 6 are supported by the two rolling bearings 9 and 17 so that they are movable in the axial direction. In this reduction gear mechanism B1, the first resilient portions 21 of the two movement-restraining members 20 are fitted and held on the shaft portions 6b and 6c so that they are in contact with the inner circumferences of the inner rings 9b and 17b of the two rolling bearings 9 and 17, respectively. Moreover, the second resilient portions 23 of the two movement-restraining members 20 are positioned between the tooth portion 6a and the two inner rings 9b and 17b so that they are in contact with both ends of the tooth portion 6a of the worm 6 and one end (the inner side in the axial direction) of the respective inner rings 9b and 17b of the two rolling bearings 9 and 17, respectively. Furthermore, the two small portions 24a formed with a small thickness are in contact with the other end (the outer side in the axial direction) of the respective inner rings 9b and 17b of the two rolling bearings 9 and 17.

In the second embodiment as described above, the steering force of the steering wheel A when steered in a steering range in which the motor 5 is not driven is transmitted to the worm 6 through the input shaft 1, torsion bar 2, output shaft 3 and worm wheel 7. With the application of a force in one direction (the right direction in FIG. 3) along the axial direction to this worm 6, the worm 6 can move in one direction along the axial direction while extending the first resilient portion 21 and bending the second resilient portion 23 of the movement-restraining member 20 on the right side of FIG. 3 and extending the first resilient portion 21 of the movement-restraining member 20 on the left side of FIG. 3. In addition, it is possible to certainly prevent the first resilient portion 21 of the movement-restraining member 20 on the left side of FIG. 3 from coming out of the inner ring 17b of the rolling bearing 17 by the small portion 24a on the left side. Moreover, with the application of a force in the other direction (the left direction in FIG. 3) along the axial direction to the worm 6, the worm 6 can move in the other direction along the axial direction while extending the first resilient portion 21 and bending the second resilient portion 23 of the movement-restraining member 20 on the left side of FIG. 3 and extending the first resilient portion 21 of the movement-restraining member 20 on the right side of FIG. 3. Besides, it is possible to certainly prevent the first resilient portion 21 of the movement-restraining member 20 on the right side of FIG. 3 from coming out of the inner ring 9b of the rolling bearing 9 by the small portion 24a on the right side.

By such a movement of the worm 6 in one direction or the other direction along the axial direction, the transmission power from the worm 6 to the driving shaft 50 of the motor 5 can be reduced, and the steering load in a steering range in which the motor 5 is not driven can be decreased.

Since other structures and functions are the same as in the first embodiment, the same elements are denoted by the same reference numerals, and the detailed explanation thereof and the explanation of their functions and effects are omitted.

Third Embodiment

Figure 4:
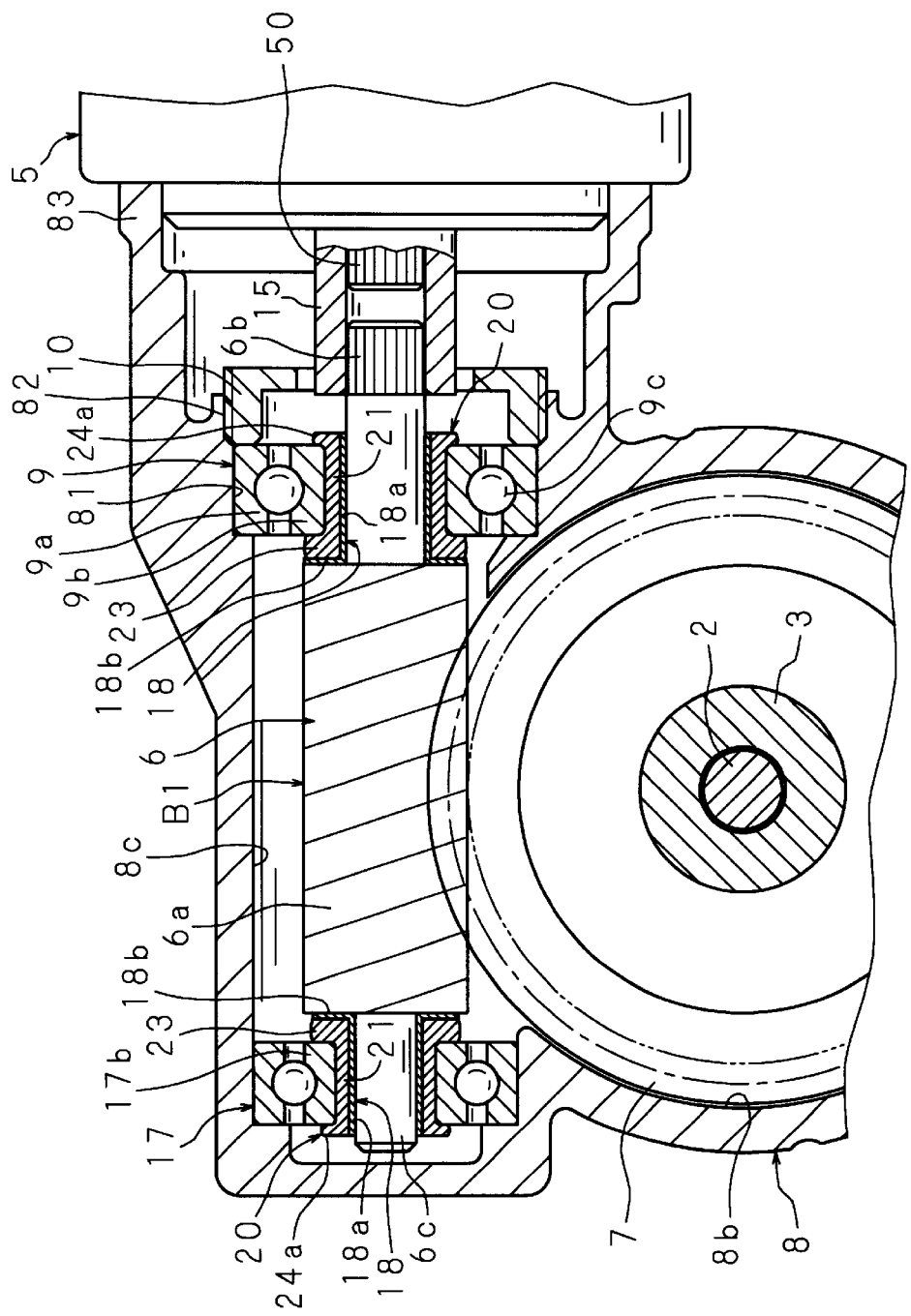
FIG. 4 is a cross sectional view showing the structure of the reduction gear mechanism section of the third embodiment of an electric power steering apparatus of the present invention.

FIG. 4 is a cross sectional view showing the structure of the reduction gear mechanism section of the third embodiment of an electric power steering apparatus of the present invention.

This electric power steering apparatus of the third embodiment comprises metal ring members 18 fitted into the inner circumferences of the first resilient portions 21 having the second resilient portions 22 and third resilient portion 24, in the shaft portions 6a, 6b on both end portions of the worm 6 as in the second embodiment.

In the third embodiment, each ring member 18 is composed of a cylindrical portion 18a and a flange portion 18b which is connected to one end of the cylindrical portion 18a and in contact with the outer surface of the second resilient portion 23 of the movement-restraining member 20. Thus, the first resilient portion 21, second resilient portion 23 and small portion 24a of the movement-restraining member 20 are present on the outer circumference of this ring member 18. These were vulcanized molded.

Like the second embodiment, the movement-restraining member 20 having such the ring member 18 in the inner circumference is used for the portions of both rolling bearings 9 and 17 of the reduction gear mechanism B1 in which the shaft portions 6b and 6c on both end portions of the worm 6 are supported rotatably by the two rolling bearings 9 and 17, respectively. In this reduction gear mechanism B1, both ring members 18 are pushed and held in the shaft portions 6b and 6c on both end portions of the worm 6 so that the outer circumferences of the first resilient portions 21 of the two movement-restraining members 20 come into contact with the inner circumferences of the inner rings 9b, 17b of the two rolling bearings 9, 17, respectively. Moreover, the two ring members 18 are positioned between the tooth portion 6a and the two inner rings 9b, 17b of the two rolling bearings 9, 17, respectively, so that the flange portions 18b of the ring members 18 are respectively in contact with one end and the other end of the tooth portion 6a.

In the third embodiment, it is possible to hold the first resilient portions 21 of the two movement-restraining members 20 on the two shaft portions 6b and 6c, respectively, in such a state that the metal ring members 18 are pushed in between the two shaft portions 6b, 6c of the metal worm 6 and the two movement-restraining members 20, respectively. Therefore, the first resilient portions 21, second resilient portions 23 and small portions 24a of the two movement-restraining members 20 can be assembled more easily compared to the case where the first resilient portions 21 of the two movement-restraining members 20 are fitted and held directly on the shaft portions 6b and 6c.

Since other structures and functions are the same as in the first embodiment, the same elements are denoted by the same reference numerals, and the detailed explanation thereof and the explanation of their functions and effects are omitted.

Fourth Embodiment

Figure 5:
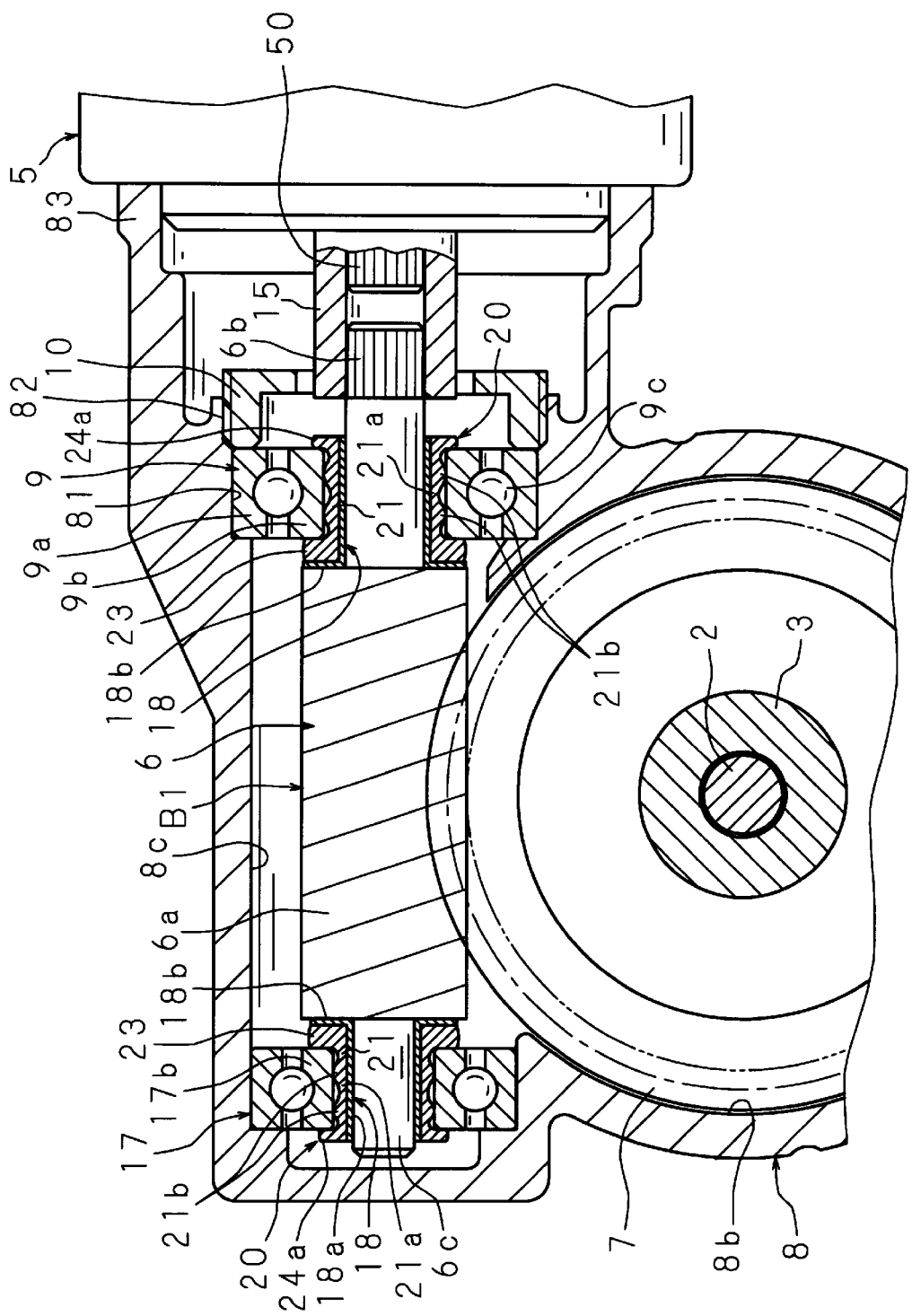
FIG. 5 is a cross sectional view showing the structure of the reduction gear mechanism section of the fourth embodiment of an electric power steering apparatus of the present invention.

FIG. 5 is a cross sectional view showing the structure of the reduction gear mechanism section of the fourth embodiment of an electric power steering apparatus of the present invention.

In the electric power steering apparatus of the fourth embodiment, the first resilient portion 21 of the movement-restraining member 20 comprising the metal ring member 18 in the inner circumference as in the third embodiment is constructed so that the inner circumference has a fitting cylindrical portion 21a whose inner circumference fits the ring member 18, and an annular projecting portion 21b projecting in a radial direction of the worm 6, on the outer circumference of this cylindrical portion 21a.

In this fourth embodiment, when vulcanizing molding the first resilient portion 21, second resilient portion 23 and small portion 24a on the outer circumference of the ring member 18 in the same manner as in the second embodiment, a plurality of annular projecting portions 21b were integrally molded on the outer circumferential surface of the cylindrical portion 21 with an appropriate distance therebetween in the axial direction. Note that the outer circumferences of the respective annular projecting portions 21b are in contact with the inner circumferences of the inner rings 9b, 17b of the two rolling bearings 9, 17, respectively.

Like the second and third embodiments, such a movement-restraining member 20 having the annular projecting portion 21b on the outer circumference is used for the portions of both rolling bearings 9 and 17 of the reduction gear mechanism B1 in which the shaft portions 6b and 6c on both end portions of the worm 6 are supported rotatably by the two rolling bearings 9 and 17, respectively. In this reduction gear mechanism B1, both ring members 18 are pushed and held in the shaft portions 6b and 6c on both end portions of the worm 6 so that the outer circumferences of the annular projecting portions 21b of the first resilient portions 21 of the two movement-restraining members 20 come into contact with the inner circumferences of the inner rings 9b, 17b of the two rolling bearings 9, 17, respectively. Moreover, the two ring members 18 are positioned between the tooth portion 6a and the two inner rings 9b, 17b of the two rolling bearings 9, 17, respectively, so that the flange portions 18*b* of the ring members 18 come into contact respectively with one end and the other end of the tooth portion 6*a*.

In the fourth embodiment, with the application of a force in one direction (the right direction in FIG. 5) along the axial direction to the worm 6 through the worm wheel 7 by a steering force of the steering wheel A when steered in a steering range in which the motor 5 is not driven, the worm 6 can move in one direction along the axial direction while extending the cylindrical portion 21*a* and annular projecting portion 21*b* of the first resilient portion 21 and bending the second resilient portion 23 of the movement-restraining member 20 on the right side of FIG. 5, and extending the cylindrical portion 21*a* and annular projecting portion 21*b* of the first resilient portion 21 of the movement-restraining member 20 on the left side of FIG. 5. On the other hand, when a force is applied in the other direction (the left direction in FIG. 5) along the axial direction to the worm 6, the worm 6 can move in the other direction along the axial direction while extending the cylindrical portion 21*a* and annular projecting portion 21*b* of the first resilient portion 21 and bending the second resilient portion 23 of the movement-restraining member 20 on the left side of FIG. 5, and extending the cylindrical portion 21*a* and annular projecting portion 21*b* of the first resilient portion 21 of the movement-restraining member 20 on the right side of FIG. 5.

By the movement of the worm 6 in one direction or the other direction along the axial direction as described above, it is possible to reduce the transmission power from the worm 6 to the driving shaft 50 of the motor 5, and decrease the steering load in a steering range in which the motor 5 is not driven. Moreover, in the first resilient portions 21 of the two movement-restraining members 20, since the cylindrical portions 21*a* are extended and the annular projecting portions 21*b* on the outer circumferences of the cylindrical portions 21*a* are also extended, it is possible to gradually decrease the steering load in a steering range in which the motor 5 is not driven, and further improve the steering feeling.

Since other structures and functions are the same as in the first through third embodiments, the same elements are denoted by the same reference numerals, and the detailed explanation thereof and the explanation of their functions and effects are omitted.

Fifth Embodiment

Figure 6:
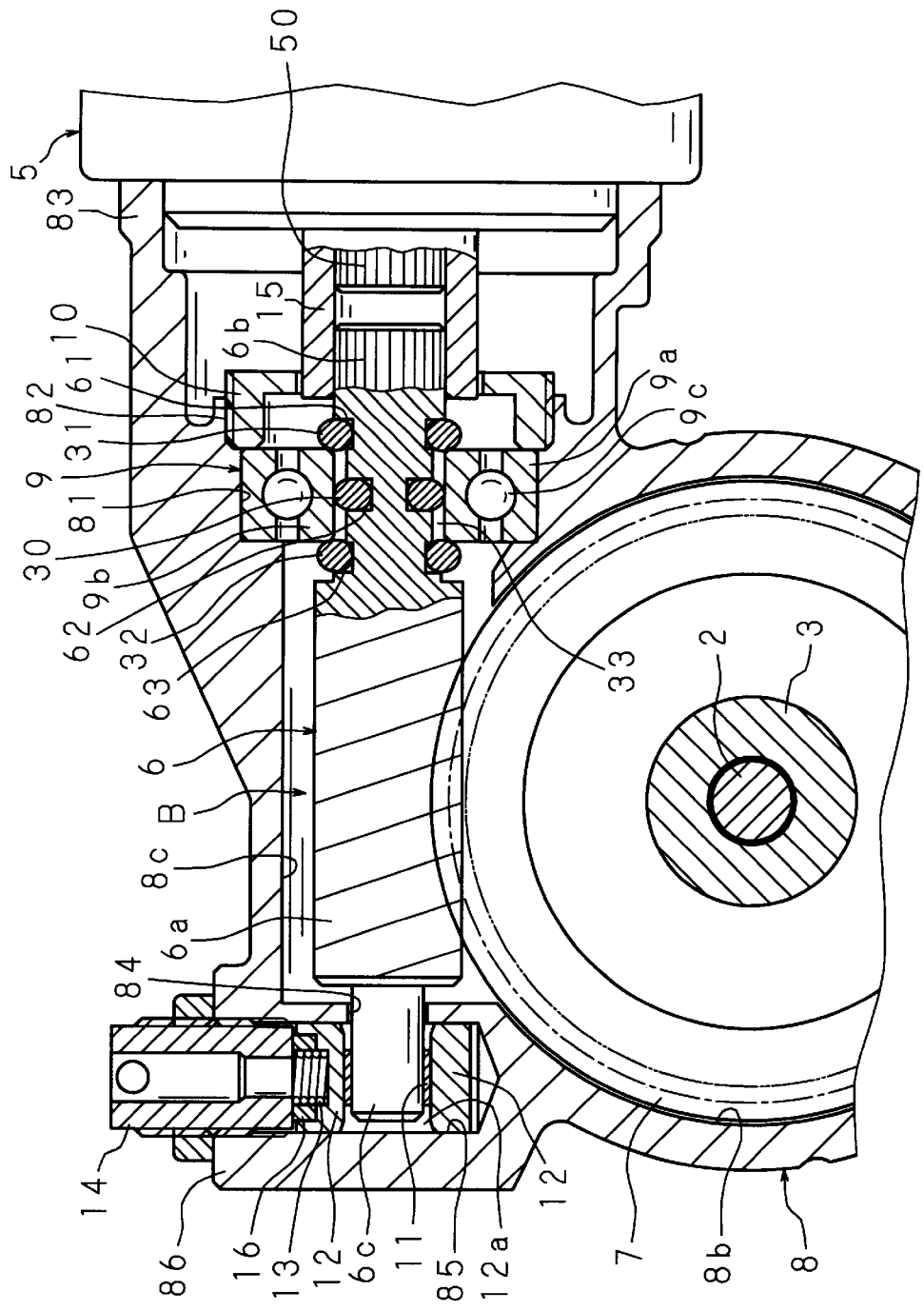
FIG. 6 is a cross sectional view showing the structure of the reduction gear mechanism section of the fifth embodiment of an electric power steering apparatus of the present invention.

FIG. 6 is a cross sectional view showing the structure of the reduction gear mechanism section of the fifth embodiment of an electric power steering apparatus of the present invention.

The electric power steering apparatus of the fifth embodiment is not the one comprising the movement-restraining member 20 whose first resilient portion 21 and second resilient portions 22, 23 are integrally molded, nor the one comprising the integrally molded first resilient portion 21, second resilient portions 23 and small portion 24 as in the first through fourth embodiments, but comprises a first resilient member 30 and second resilient members 31, 32 made of rubber O rings.

In the fifth embodiment, three annular grooves 61, 62 and 63 are formed with a distance therebetween in the axial direction, on the outer circumference of the shaft portion 6*b* on one end side of the worm 6, and the depth of the center annular groove 62 is deeper than that of the annular grooves 61 and 63 on both sides. In this center annular groove 62, the first resilient member 30, which is in contact with the inner circumference of the inner ring 9*b* of the rolling bearing 9 and can be bent by the application of a force to the worm 6 in the axial direction, is fitted and held. Then, the second resilient members 31 and 32, which are in contact with both ends of the inner ring 9*b* of the rolling bearing 9, are fitted and held in the annular grooves 61 and 63 on both sides, respectively. Furthermore, a clearance 33 is provided between the inner circumference of the inner ring 9*b* of the rolling bearing 9 and the outer circumference of the shaft portion 6*b* on one end of the worm 6. The clearance 33 allows the first resilient member 30 to be bent in the axial direction of the worm 6 by a force in the axial direction applied to the worm 6. Note that this clearance 33 is formed by making the outside diameter of the shaft portion 6*b* on one end side of the worm 6 smaller in a part between the annular grooves 61 and 63 on both sides than in other part. By forming the clearance 33 by varying the outside diameter of the shaft portion 6*b* on one end side of the worm 6 in this manner, it is possible to obtain a relatively large contact area between the second resilient members 31, 32 and both ends of the inner ring 9*b* of the rolling bearing 9, thereby allowing the whole second resilient members 31 and 32 to be bent easily by a force in the axial direction applied to the worm 6.

The first resilient member 30 and second resilient members 31, 32 constructed as described above are used, for example, for the portion of the rolling bearing 9 of the reduction gear mechanism B1 in which the worm 6 is supported by the rolling bearing 9 and sliding bearing 11 so that the worm 6 is movable in the axial direction as in the first embodiment, or for the portions of both rolling bearings 9 and 17 of the reduction gear mechanism B1 in which the worm 6 is supported rotatably by the two rolling bearings 9 and 17 as in second through fourth embodiments.

In the fifth embodiment, if a steering force of the steering wheel A when steered in a steering range in which the motor 5 is not driven is applied in one direction (right direction in FIG. 6) along the axial direction to the worm 6 through the worm wheel 7, the first resilient member 30 and second resilient member 32 are bent in the axial direction of the worm 6, and the worm 6 can move in one direction along the axial direction. On the other hand, with the application of a force in the other direction (the left direction in FIG. 6) along the axial direction to the worm 6, the first resilient member 30 and second resilient member 31 are bent in the axial direction of the worm 6, and the worm 6 can move in the other direction along the axial direction. Thus, with the movement of the worm 6 in one direction or the other direction along the axial direction, it is possible to reduce the transmission power from the worm 6 to the driving shaft 50 of the motor 5, and decrease the steering load in a steering range in which the motor 5 is not driven. In addition, since pre-fabricated O rings are used, it is possible to reduce the costs of the first resilient member 30 and second resilient members 31 and 32, and consequently the cost of the electric power steering apparatus.

Note that, in the fifth embodiment, the first resilient member 30 and the second resilient members 31, 32 may use annular resilient plates in place of the O rings. Moreover, the first resilient member 30 and/or the second resilient members 31, 32 may be held in the inner ring 9*b* of the rolling bearing 9 by an adhesive or the like.

Since other structures and functions are the same as in the first through third embodiments, the same elements are denoted by the same reference numerals, and the detailed explanation thereof and the explanation of their functions and effects are omitted.

Sixth Embodiment

An electric power steering apparatus of the sixth embodiment of the present invention has a construction in which the second resilient portions 22 and 23, or the second resilient portion 23 and small portion 24a are integrally molded on both end portions of the cylindrical first resilient portion 21 of the movement-restraining member 20 as in the first through fourth embodiments, and the first resilient portions 21 of the movement-restraining members 20 are fitted and held in the inner circumferences of the inner rings 9b and 17b of the two rolling bearings 9 and 17, respectively, instead of fitting and holding the first resilient portion 21 on the shaft portion 6b or 6b, 6c of the worm 6.

Figure 7:
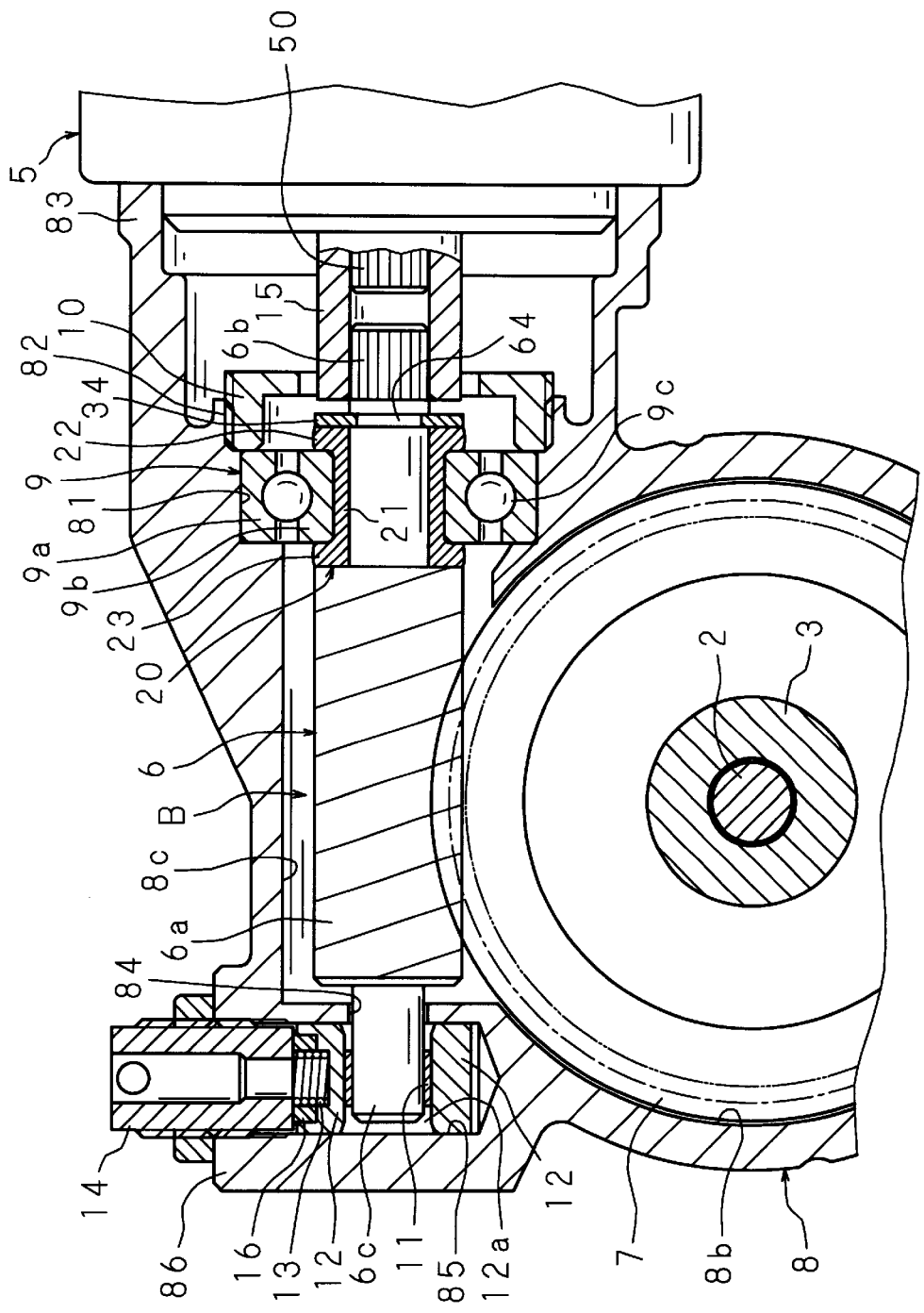
FIG. 7 is a cross sectional view showing the structure of the reduction gear mechanism section of the sixth embodiment of an electric power steering apparatus of the present invention.

FIG. 7 is a cross sectional view showing the structure of the reduction gear mechanism section of the sixth embodiment.

In the sixth embodiment, when the first resilient portion 21 of the movement-restraining member 20 is held in the inner circumference of the inner ring 9b of the rolling bearing 9, the structure shown in FIG. 7 is obtained. On the other hand, when the first resilient portions 21 of the movement-restraining members are held in the inner circumferences of the inner rings 9b and 17b of the rolling bearings 9 and 17, respectively, structures similar to those shown in FIG. 3 through FIG. 5 are obtained.

In FIG. 7, an annular projecting portion 34 in contact with the outer surface of the second resilient portion 22 of the movement-restraining member 20 is provided on the shaft portion 6b on one end side of the worm 6. This annular projecting portion 34 is constructed by fitting a fastening ring into an annular groove 64 formed in a midway point of the shaft portion 6b on one end side of the worm 6.

In the structure shown in FIG. 7, with the application of a force in one direction (the right direction in FIG. 7) along the axial direction to the worm 6, the second resilient portion 23 of the movement-restraining member 20 on the left side of FIG. 7 is bent, and the worm 6 can move in one direction along the axial direction. On the other hand, with the application of a force in the other direction (the left direction in FIG. 7) along the axial direction to the worm 6, the second resilient portion 22 of the movement-restraining member 20 on the right side of FIG. 7 is bent, and the worm 6 can move in the other direction along the axial direction. Thus, with the movement of the worm 6 in one direction or the other direction along the axial direction, it is possible reduce the transmission power from the worm 6 to the driving shaft 50 of the motor 5, and decrease the steering load in a steering range in which the motor 5 is not driven.

Since other structures and functions are the same as in the first through fourth embodiments, the same elements are denoted by the same reference numerals, and the detailed explanation thereof and the explanation of their functions and effects are omitted.

Note that although one end portion of the worm 6 is supported by the rolling bearing 9 and the other end portion is supported by the sliding bearing 11 in the above-explained first and fifth embodiments, it is possible to use the rolling bearing 17 as in the second through fourth embodiments in place of the sliding bearing 11 of the first and fifth embodiment, and support both end portions of the worm 6 by the two rolling bearings 9 and 17. In this case, the movement-restraining member 20 shown in FIG. 2 is disposed on both of the shaft portions 6b and 6c of the worm 6, and the first resilient member 30 and second resilient members 31, 32 of FIG. 6 are disposed on both of the shaft portions 6b, 6c of the worm 6.

Moreover, in the above-described first embodiment, it is possible to eliminate the pushing member 12, resilient member 13 and operating member 14 for adjusting the distance between the centers of rotation of the worm 6 and worm wheel 7, provide a sliding bearing (not shown) on the other end portion of a third housing portion 8c, and support the shaft portion 6c on the other end side of the worm 6 by this sliding bearing so that the shaft portion 6c is movable in the axial direction.

Seventh Embodiment

Figure 8:
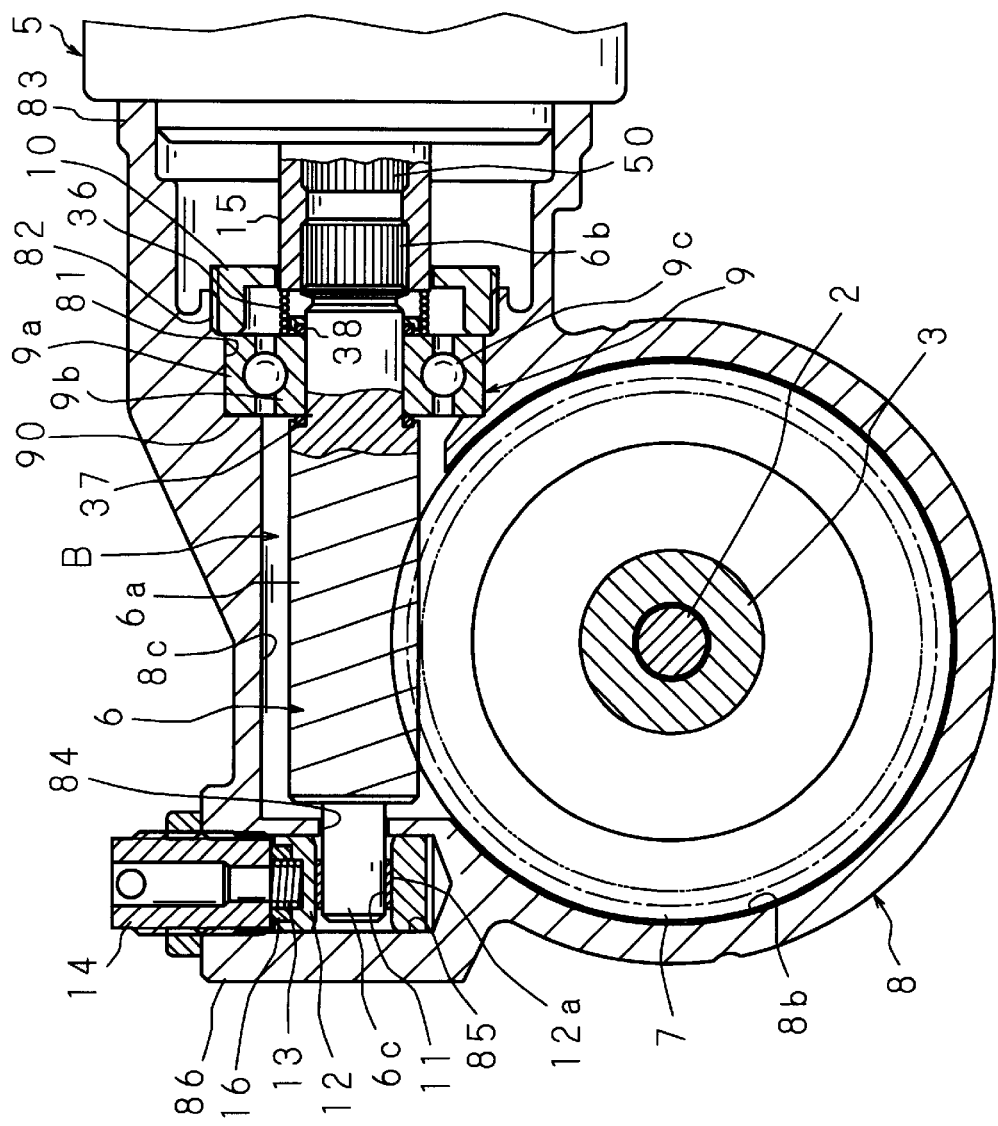
FIG. 8 is a cross sectional view showing the structure of the reduction gear mechanism section of the seventh embodiment of an electric power steering apparatus of the present invention.
Figure 9:
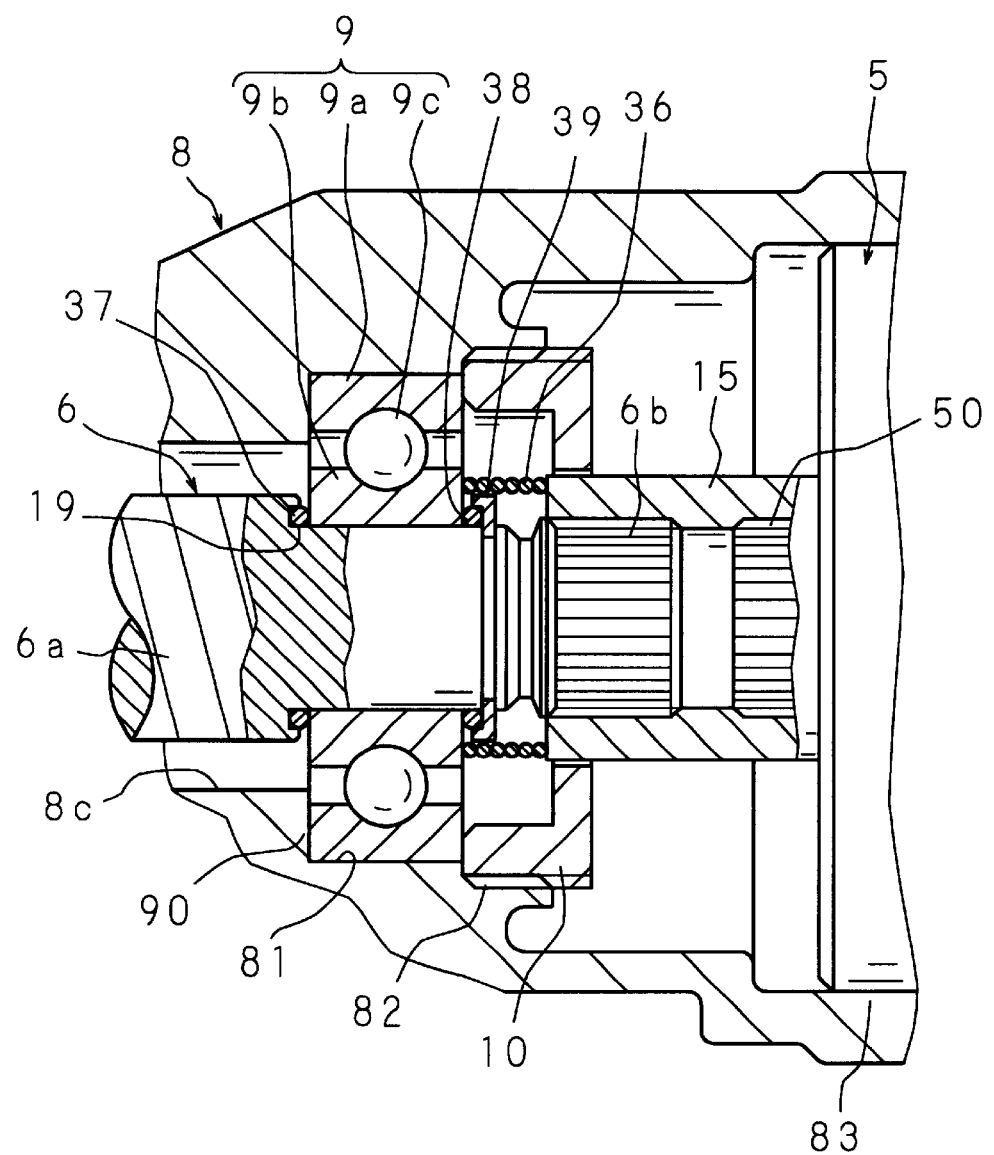
FIG. 9 is an enlarged cross sectional view showing the structure of an essential portion of the seventh embodiment of an electric power steering apparatus of the present invention.

FIG. 8 is a cross sectional view showing the structure of the reduction gear mechanism section of the seventh embodiment of an electric power steering apparatus of the present invention, and FIG. 9 is an enlarged cross sectional view showing the structure of an essential portion of the seventh embodiment.

The third housing portion 8c is elongated in the axial direction of the worm 6, and its one end portion in the longitudinal direction is opened and the other end is closed. On one end portion of the third housing portion 8c, there are provided the fitting hole 81 into which the rolling bearing 9 is to be fitted, the screw hole 82 connected to one end portion of the fitting hole 81, the motor mounting portion 83 connected to the screw hole 82, and a restraining portion 90, connected to the other end of the fitting hole 81, for restraining the movement of the rolling bearing 9. Then, the outer ring 9a of the rolling bearing 9 is fitted into the fitting hole 81, and the screw ring 10 in contact with one end of the outer ring 9a is screwed into the screw hole 82 to push the other end of the outer ring 9a of the rolling bearing 9 against the restraining portion 90. Further, the motor 5 is mounted on the motor mounting portion 83.

Besides, provided integrally on the other end portion of the third housing portion 8c are a concave hole 84 into which the shaft portion 6c on the other end side of the worm 6 is inserted and guide member 86 having the cylindrical guide hole 85 formed in a radial direction of the worm 6 to face the inner surface of the concave hole 84. In this guide hole 85, there are housed the movable pushing member 12 having the sliding bearing 11, and the resilient member 13 functioning as forcing means for forcing the pushing member 12 in one direction. Moreover, the operating member 14 for moving the pushing member 12 through the resilient member 13 is screwed into the outward opening edge side of the guide hole 85.

The reduction gear mechanism B reduces the speed of the rotation of the driving shaft 50 by the meshing of the worm 6, which is coupled to the driving shaft 50 of the motor 5 through the cylindrical shaft coupling 15, with the worm wheel 7 which is fitted and fixed on the middle portion of the output shaft 3 and connected to the steering mechanism, transmits the rotation to the output shaft 3, and then transmits the rotation from the output shaft 3 to a lack-and-pinion steering mechanism (not shown), for example, through a universal joint.

The worm 6 is disposed to cross the shaft axis of the output shaft 3, and comprises the shaft portions 6b and 6c on both ends of the tooth portion 6a having a plurality of lines of teeth. The shaft portion 6b on one end side is inserted into the inner ring 9b of the rolling bearing 9 so that it is movable in the axial direction, and supported rotatably by the fitting hole 81 through the rolling bearing 9. The shaft portion 6c on the other end side is inserted into the sliding bearing 11 from the concave hole 84, and supported rotatably by the pushing member 12 through the sliding bearing 11.

The inner ring 9b of the rolling bearing 9 supporting the shaft portion 6b on one end side of the worm 6 is forced in the left direction (a direction away from the motor 5) along the axial direction on FIG. 8 by a resilient member 36 provided as forcing means between one end of the inner ring 9b and the shaft coupling so as to eliminate the clearance between the inner ring 9b and the outer ring 9b, i.e., a thrust clearance of the rolling bearing 9. Note that a plurality of rolling elements 9c are interposed between the outer ring 9a and the inner ring 9b. Then, the force exerted by the resilient member 36 is applied to the outer ring 9a through the rolling elements 9c, and the movement of the inner ring 9b in the axial direction is stopped.

On one end portion of the worm 6 which is supported by the rolling bearing 9 and the sliding bearing 11 so that the worm 6 is movable in the axial direction as described above, two resilient members 37 and 38 are disposed between the worm 6 and both ends of the inner ring 9b of the rolling bearing 9, at positions separated from the resilient member 36, so as to restrain the movement of the worm 6 in both directions along the axial direction in a state in which the movement of the inner ring 9b due to the resilient member 36 is stopped.

The resilient members 37 and 38 are made of O rings formed from synthetic rubber, for example, and held on the outer circumferential surface of the worm 6. The resilient members 37 and 38 are held by an annular holding groove 19 formed on one end portion of the tooth portion 6a and a holding ring 39 fitted and fixed in an annular groove formed in a midway point of the shaft portion 6b, respectively, and come into contact with both ends of the inner ring 9b of the rolling bearing 9 (see FIG. 9). More specifically, in a state in which the rolling bearing 9 is fixed to the housing 8 by the resilient member 36, the resilient members 37 and 38 are brought into a state in which they do not receive a force exerted by the resilient member 36 (they are not bent at all as they do not receive the force) and then assembled on the worm 6. Then, the resilient members 37 and 38 restrain the movement of the worm 6 with respect to the inner ring 9b of the rolling bearing 9 in one direction or the other direction along the axial direction. Note that the resilient member 36 as the forcing means has a higher elastic restoring force than those of the movement-restraining resilient members 37 and 38, and restrains the movement of the inner ring 9b of the rolling bearing 9 in the axial direction by a component force of the rotation force applied to the worm 6 from the worm wheel 7 when the steering wheel A is steered in a steering range in which the motor 5 is not driven.

Further, the pushing member 12 for supporting the shaft portion 6c on the other end side of the worm 6 through the sliding bearing 11 is formed in a cylindrical shape with an outside diameter substantially equal to the inside diameter of the guide hole 85. In a middle portion in the axial direction of this pushing member 12, that is, at a midway point in the moving direction of the pushing member 12 that moves along the guide hole 85, there is a fitting hole 12a pierced orthogonally to the moving direction of the pushing member 12, and the sliding bearing 11 is fitted and fixed in this fitting hole 12a.

The resilient member 13 interposed between the pushing member 12 and the operating member 14 is made of a coil spring. This resilient member 13 forces the pushing member 12 in the moving direction so as to apply a pre-pressure to the meshing portion of the worm 6 and worm wheel 7. Moreover, a ring-shaped resilient plate 16 made from synthetic rubber, for example, is mounted on the outer circumference of the resilient member 13 between the pushing member 12 and the operating member 14. Accordingly, when the resilient member 13 is bent by a predetermined dimension by a rotating operation of the operating member 14, an end face of the operating member 14 comes into contact with the other face of the resilient plate 16, and the resilient plate 16 is bent together with the resilient member 13.

The electric power steering apparatus constructed as described above supports the shaft portion 6b on one end side of the worm 6 coupled to the driving shaft 50 of the motor 5 through the shaft coupling 15 by the rolling bearing 9 and supports the shaft portion 6c on the other end side by the sliding bearing 11 so that the shaft portions 6b and 6c are movable in the axial direction. However, since the resilient member 36 is provided between the inner ring 9b of the rolling bearing 9 and the shaft coupling 15 so as to force the inner ring 9b in the left direction along the axial direction on FIG. 8 and eliminate the thrust clearance of the rolling bearing 9, a backslash of the worm 6 in the axial direction is eliminated. Further, since the resilient member 36 for forcing the inner ring 9b of the rolling bearing 9 is provided between the inner ring 9b and the shaft coupling 15 that rotates together with the worm 6 and the driving shaft 50 of the motor 5, it is possible to eliminate a rotating load of the worm 6 due to the resilient member 36 and improve the rotating performance of the worm 6.

In addition, the resilient members 37 and 38, which restrain the movement of the worm 6 in both directions along the axial direction in a state in which the movement of the inner ring 9b due to the resilient member 36 is stopped, i.e., by not receiving a force exerted by the resilient member 36 at positions separated from the resilient member 36, are provided between the worm 6 and the inner ring 9b of the rolling bearing 9 without a thrust clearance. Therefore, if a steering force of the steering wheel A when steered in a steering range in which the motor 5 is not driven, i.e., a steering range with a small steering angle of around 1°, for example, during high-speed driving of a vehicle, is transmitted to the worm 6 through the input shaft 1, torsion bar 2, output shaft 3 and worm wheel 7, the worm 6 overcomes the elastic restoring force of the resilient member 37 or 38 due to a component force applied in the axial direction to the worm 6, and moves in one direction or the other direction along the axial direction. Consequently, the rotation angle of the worm 6 becomes smaller, thereby reducing the transmission power from the worm 6 to the driving shaft 50 of the motor 5 and decreasing the steering load in the steering range in which the motor 5 is not driven. Moreover, since the elastic restoring force of the resilient member 36 for eliminating the thrust clearance of the rolling bearing 9 is not applied to the worm 6, it is possible equalize the bent amounts of the resilient members 37 and 38 with respect to a certain steering angle in the left and right directions from the steering neutral position, and improve the steering feeling.

Further, the resilient members 37 and 38 for restraining the movement of the worm 6 in both directions along the axial direction are provided at positions separated from the resilient member 36 for forcing the inner ring 9b of the rolling bearing 9 and in a state in which the movement of the inner ring 9b due to the resilient member 36 is stopped. Therefore, it is possible to set elastic restoring forces of the resilient members 37 and 38, more specifically, much smaller elastic restoring forces than an elastic restoring force necessary for eliminating the thrust clearance, irrespective of the resilient member 36, and further decrease the steering load in the steering range in which the motor 5 is not driven.

Besides, since the other end portion of the worm 6 is supported through the sliding bearing 11 by the pushing member 12 forced by the resilient member 13, the resilient member 13 forces the worm 6 toward the worm wheel 7, thereby adjusting the distance between the centers of rotation of the worm 6 and worm wheel 7. Accordingly, the amount of backlash in the meshing portion of the worm 6 and worm wheel 7 can be decreased.

Eighth Embodiment

Figure 10:
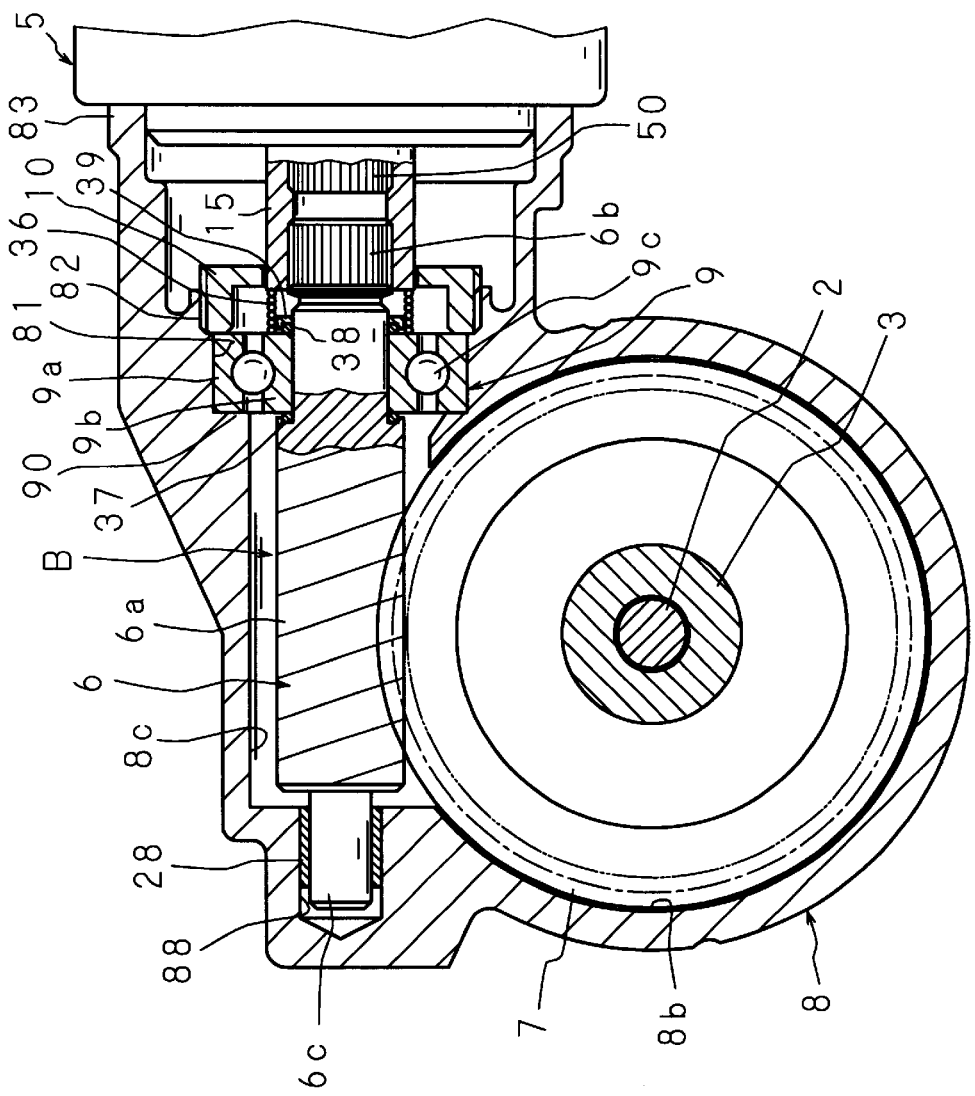
FIG. 10 is a cross sectional view showing the structure of the reduction gear mechanism section of the eighth embodiment of an electric power steering apparatus of the present invention.

FIG. 10 is a cross sectional view showing the structure of the reduction gear mechanism section of the eighth embodiment of an electric power steering apparatus of the present invention.

The electric power steering apparatus of the eighth embodiment does not comprise the pushing member 12, resilient member 13 and operating member 14 for adjusting the distance between the centers of rotation of the worm 6 and worm wheel 7, and supports the worm 6 by forming a fitting hole 88 in the third housing portion 8c of the housing 8, fitting and fixing a sliding bearing 28 into the fitting hole 88, and inserting the shaft portion 6c on the other end side of the worm 6 into the sliding bearing 28.

In this eighth embodiment, the rolling bearing 9 for supporting the shaft portion 6b on one end side of the worm 6, the resilient member 36 for forcing the inner ring 9b of the rolling bearing 9, and the resilient members 37 and 38 for restraining the movement of the worm 6 in both directions along the axial direction are also provided in the same manner as in the seventh embodiment.

Since other structures and functions are the same as in the seventh embodiment, the same elements are denoted by the same reference numerals, and the detailed explanation thereof and the explanation of their functions and effects are omitted.

Ninth Embodiment

Figure 11:
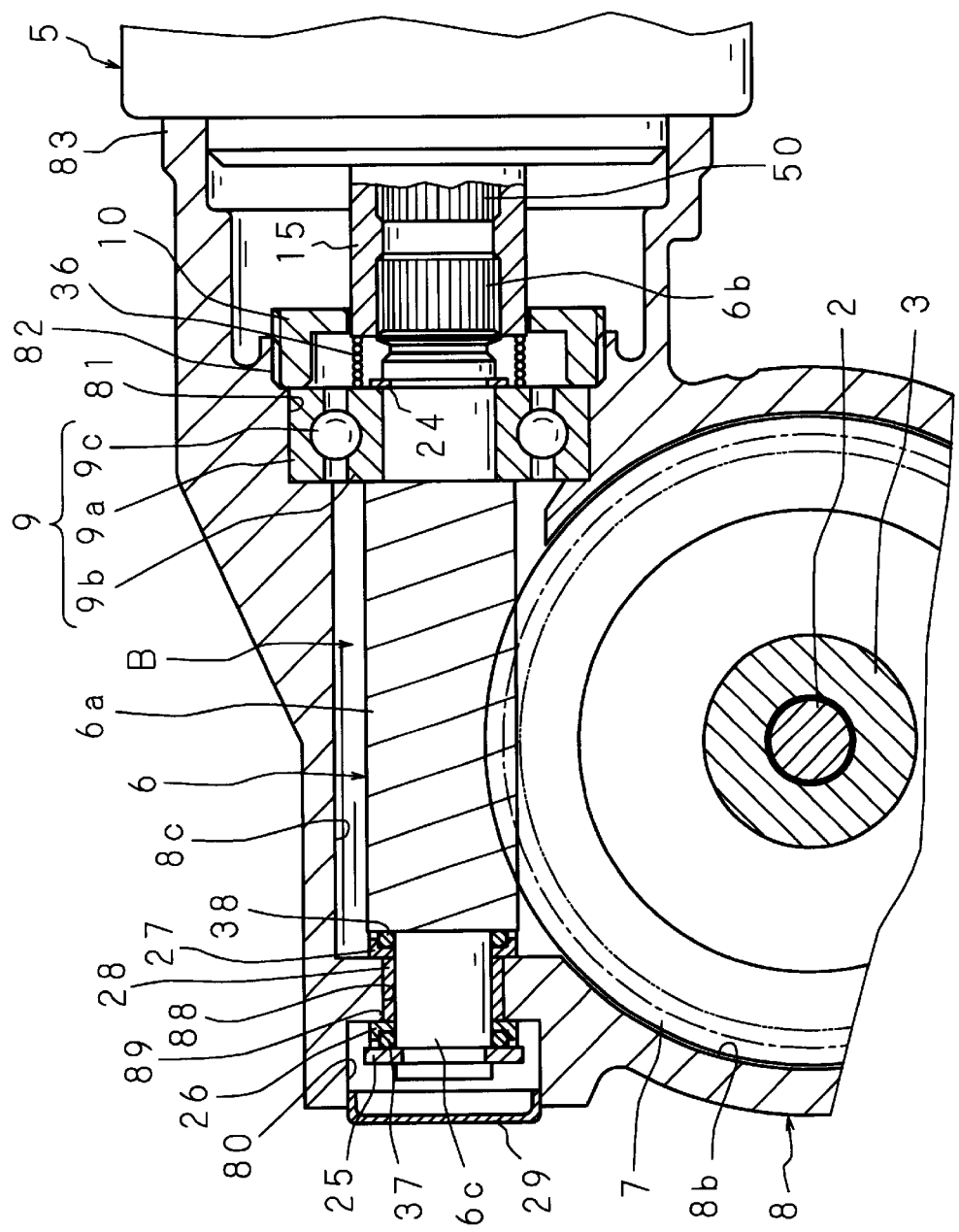
FIG. 11 is a cross sectional view showing the structure of the reduction gear mechanism section of the ninth embodiment of an electric power steering apparatus of the present invention.

FIG. 11 is a cross sectional view showing the structure of the reduction gear mechanism section of the ninth embodiment of an electric power steering apparatus of the present invention.

The electric power steering apparatus of the ninth embodiment disposes the resilient members 37 and 38 for restraining the movement of the worm 6 in both directions along the axial direction, between the shaft portion 6c and both ends of the sliding bearing 28 supporting the shaft portion 6c on the other end side of the worm 6, instead of positioning the resilient members 37 and 38 between the worm 6 and the inner ring 9b of the rolling bearing 9 supporting the shaft portion 6b on one end side of the worm 6 as in the seventh and eighth embodiments.

In the ninth embodiment, the other end of the third housing portion 8c of the housing 8 has the fitting hole 88 into which the sliding bearing 28 is fitted, and comprises a ring member 89 formed integrally with the housing 8, and a concave space 80 which is connected to the ring member 89, has a diameter larger than the fitting hole 88 and is opened to the outside. The shaft portion 6c on the other end side of the worm 6 is inserted into the sliding bearing 28 so that it is movable in the axial direction. Moreover, a lid member 29 is detachably attached to the concave space 80.

The shaft portion 6b on one end of the worm 6 is supported by being inserted into the inner ring 9b of the rolling bearing 9. The resilient member 36 made of a coil spring is provided between the inner ring 9b of the rolling bearing 9 and the coupling shaft 15. Further, a stopper ring 24 for restraining the movement of the inner ring 9b of the rolling bearing 9 in the axial direction is provided on a midway point of the shaft portion 6b on one end side of the worm 6. The shaft portion 6c on the other end side of the worm 6 has a stopper ring 25 on a midway point in the axial direction.

Besides, the resilient members 37 and 38 made of O rings formed from synthetic rubber are held on the shaft portion 6c on the other end side of the worm 6. The resilient members 37 and 38 are fitted on the shaft portion 6c so that they are movable in the axial direction, and held in two holding rings 26 and 27 facing both ends of the sliding bearing 28, respectively. The movement of the worm 6 with respect to the sliding bearing 28 in one direction or the other direction along the axial direction is restrained by the contact of the holding rings 26 and 27 with both ends of the sliding bearing 28 or both ends of the ring member 89 and the contact of the resilient members 37 and 38 with the other end of the tooth portion 6a and the stopper ring 25. When a force is applied to the worm 6 in the axial direction of the worm 6, the resilient members 37 and 38 are bent through the holding rings 26 and 27. Note that the holding rings 26 and 27 are made from a material such as a synthetic resin with a lower friction coefficient and higher sliding property than the resilient members 37 and 38. Accordingly, when the holding rings 26 and 27 are rotated together with the worm 6 due to the contact resistance with the resilient members 37 and 38, the contact resistances between the holding rings 26, 27 and the sliding bearing 28 and ring member 89 are decreased, thereby improving the rotating performance of the worm 6.

Further, the sliding bearing 28 has a length substantially equal to the length of the ring member 89 in the axial direction, and the resilient members 37 and 38 are positioned on both ends of the sliding bearing 28 and the ring member 89 by bringing the holding rings 26 and 27 into contact with both end portions of the sliding bearing 28 and both ends of the holding member 89. Alternatively, the sliding bearing 28 and the ring member 89 may have different lengths in the axial direction, and the length of the sliding bearing 28 may be longer than that of the ring member 89. In this case, it is necessary to bring the holding members 26 and 27 into contact with both ends of the sliding bearing 28 and to position the resilient members 37 and 38 on both ends of the sliding bearing 28. It is also possible to make the length of the ring member 89 longer than that of the sliding bearing 28. In this case, it is necessary to bring the holding members 26 and 27 into contact with both ends of the ring member 89 and to position the resilient members 37 and 38 on both end portions of the ring member 89.

In the ninth embodiment, since the resilient members 37 and 38 for restraining the movement of the worm 6 in both directions along the axial direction can be positioned without being affected by the rolling bearing 9 and the resilient member 36 that forces the inner ring 9b of the rolling bearing 9, this embodiment can be adopted easily even when the section of the reduction gear mechanism B is formed in a small size.

Since other structures and functions are the same as in the seventh and eighth embodiments, the same elements are denoted by the same reference numerals, and the detailed explanation thereof and the explanation of their functions and effects are omitted.

Note that, in the above-explained eighth and ninth embodiments, one end portion of the worm 6 is supported by the rolling bearing 9 and the other end portion is supported by the sliding bearing 11 or 28, but both end portions of the worm 6 may instead be supported by the rolling bearings so that the worm 6 is movable in the axial direction. In this case, one end side of the worm 6 is constructed in the same manner as in the seventh embodiment, and, on the other end side though not shown, forcing means such as a coil spring for forcing the inner ring in the axial direction is provided between the inner ring of the rolling bearing and the housing 8 or a restraining member which is restrained from moving in the axial direction of the worm 6, thereby eliminating the thrust clearance of the rolling bearing. Note that, although not shown in the drawing, as the restraining member, for example, it is possible to use a rotation shaft, which passes through the rotation center of the worm 6 and is coupled to the driving shaft 50 of the motor 5, and a rotating member having a flange portion provided on an end portion of the rotation shaft, and the forcing means may be provided between the flange portion and the inner ring 9b of the rolling bearing 9. In such a structure with the rotating member, it is possible to rotate the forcing means together with the worm, and therefore the relative rotation resistance between the forcing means and the restraining member can be reduced and the thrust clearance of the rolling bearings on both sides can be eliminated without applying a rotating load to the worm 6.

Moreover, in the above-explained seventh, eighth and ninth embodiments, although the resilient members 37 and 38 are held on the worm 6, the resilient members 37 and 38 may be supported on both ends of the inner ring 9b of the rolling bearing 9, both ends of the sliding bearing 28, or both ends of the ring member 89.

Further, a ring member which is positioned between the resilient members 37 and 38 to restrain the movement of the worm 6 in both directions along the axial direction together with the resilient members 37 and 38 is constructed as the inner ring 9b of the rolling bearing 9, or the ring member 89 including the sliding bearing 28. Alternatively, a ring member having a through hole into which the shaft portion of the worm 6 is to be inserted may be provided in a position different from the inner ring 9b of the rolling bearing 9 and the ring member 89. Alternatively, the pushing member 12 in the seventh embodiment may be used as the ring member. In the case where the pushing member 12 is the ring member, the resilient members 37 and 38 are provided between the shaft portion 6c and both end portions of the fitting hole 12 of the pushing member 12.

As described in detail above, according to the electric power steering apparatus of the first aspect of the present invention, even when bearing means for supporting the worm comprises a single rolling bearing, it is possible to decrease the steering torque in a steering range in which the motor is not driven. Moreover, although this structure includes the first resilient portion and two second resilient portions, it is possible to improve the assembling operation. Furthermore, it is possible to improve the durability of the first resilient member and second resilient members, and therefore the electric power steering apparatus can be used over a long period of time.

According to the electric power steering apparatus of the second aspect of the present invention, even when bearing means for supporting the worm comprises a single rolling bearing, it is possible to decrease the steering torque in a steering range in which the motor is not driven, and omit the process for holding the first resilient member and second resilient members. Moreover, although this structure includes the first resilient member and two second resilient members, it is possible to improve the assembling operation.

According to the electric power steering apparatus of the third aspect of the present invention, it is possible to decrease the steering torque in a steering range in which the motor is not driven, prevent the first resilient member and second resilient members from coming out of the inner ring of the rolling bearing by one of the second resilient members, and maintain them in appropriate positions over a long period of time. Moreover, although this structure includes the first resilient member and two second resilient members, it is possible to improve the assembling operation, and reduce the cost of the electric power steering apparatus.

According to the electric power steering apparatus of the fourth aspect of the present invention, it is possible to gradually decrease the steering torque in a steering range in which the motor is not driven, and further improve the steering feeling.

According to the electric power steering apparatus of the fifth aspect of the present invention, it is possible to assemble the movement-restraining member, first resilient member and second resilient members more easily.

According to the electric power steering apparatus of the sixth aspect of the present invention, it is possible to reduce the costs of the first resilient member and second resilient member, and consequently reduce the cost of the electric power steering apparatus.

According to the electric power steering apparatus of the seventh aspect of the present invention, it is possible to eliminate the thrust clearance of the rolling bearing that supports the worm, and set the elastic restoring force of the resilient member for restraining the movement of the worm in both directions along the axial direction, irrespective of the forcing means, thereby decreasing the steering torque in a steering range in which the motor is not driven and improving the steering feeling.

According to the electric power steering apparatus of the eighth aspect of the present invention, the structure can be simplified compared to a structure in which two rolling bearings are used to support the worm, and it is possible to reduce the cost of the electric power steering apparatus and decrease the size and weight of the worm supporting portion.

According to the electric power steering apparatus of the ninth aspect of the present invention, it is possible to position the resilient members without being affected by the position of the rolling bearing, thereby increasing the flexibility in design.

According to the electric power steering apparatuses of the tenth and eleventh aspects of the present invention, it is possible to further simplify the structure and further reduce the cost.

According to the electric power steering apparatus of the twelfth aspect of the present invention, it is possible to adjust the distance between the centers of rotation of the worm and worm wheel, and decrease the amount of backlash in the meshing portion of the worm and worm wheel.

As this invention may be embodied in several forms without departing from the spirit of essential performances thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus comprising a worm that is rotated by a steering assisting electric motor, bearing means for supporting said worm, and a worm wheel which meshes with said worm and is connected to a steering mechanism, for assisting steering by the rotation of said electric motor, wherein said bearing means comprises:

a rolling bearing with an inner ring into which a shaft portion on one end side of said worm is inserted, for supporting said worm rotatably;

a first resilient member disposed in contact with an inner circumference of said inner ring of said rolling bearing, and capable being extended in a axial direction of said worm by a force applied to said worm in the axial direction; and two second resilient members for restraining a movement of said worm in the axial direction, said second resilient members being held on said worm or said inner ring so as to be in contact with both ends of said inner ring of said rolling bearing.

2. The electric power steering apparatus as set forth in claim 1, wherein said first resilient member and said second resilient members are formed integrally as a movement-restraining member.

3. The electric power steering apparatus as set forth in claim 2, wherein one of said second resilient members has a smaller movement restraining force in the axial direction of said worm than the other.

4. The electric power steering apparatus as set forth in claim 2, wherein said first resilient member comprises:

a cylindrical portion; and an annular projecting portion projecting in a radial direction of said worm, on an outer circumference of said cylindrical portion.

5. The electric power steering apparatus as set forth in claim 2, further comprising a ring member between an inner circumference of said first resilient member and said worm.

6. The electric power steering apparatus as set forth in claim 1, wherein one of said second resilient members has a smaller movement restraining force in the axial direction of said worm than the other.

7. The electric power steering apparatus as set forth in claim 1, wherein said first resilient member comprises:

a cylindrical portion; and an annular projecting portion projecting in a radial direction of said worm, on an outer circumference of said cylindrical portion.

8. The electric power steering apparatus as set forth in claim 1, further comprising a ring member between an inner circumference of said first resilient member and said worm.

9. The electric power steering apparatus as set forth in claim 1, wherein said first resilient member and said second resilient members are O rings.

10. The electric power steering apparatus as set forth in claim 1, wherein said worm is capable of being tilted about a portion supported by said rolling bearing, and pushing means for pushing said worm toward said worm wheel is further provided.

11. An electric power steering apparatus comprising a worm that is rotated by a steering assisting electric motors, bearing means for supporting said worm, and a worm wheel which meshes with said worm and is connected to a steering mechanism, for assisting steering by the rotation of said electric motor, wherein said bearing means comprises:

a rolling bearing with an inner ring into which a shaft portion on one end side of said worm is inserted, for supporting said worm rotatably;

two resilient members for restraining a movement of said worm in the axial direction, said second resilient members being held on said worm or said inner ring so as to be in contact with both ends of said inner ring of said rolling bearing;

the rolling bearing being constructed so as to support said worm so that said worm is movable in the axial direction;

forcing means for forcing said inner ring of said rolling bearing in the axial direction of said worm; and further resilient members restraining movement of said worm along the axial direction in the absence of movement of said inner ring of said rolling bearing due to said forcing means.

12. The electric power steering apparatus as set forth in claim 11, wherein said bearing means comprises a sliding bearing into which the other end portion of said worm is inserted.

13. The electric power steering apparatus as set forth in claim 12, wherein said resilient members are disposed in contact with a ring member provided on said bearing means and said worm, respectively.

14. The electric power steering apparatus as set forth in claim 13, wherein said ring member is said inner ring.

15. The electric power steering apparatus as set forth in claim 12, wherein said resilient members are held on said worm, said sliding bearing, or a ring member so that said resilient members are positioned on both end portions of said sliding bearing and/or both end portions of said ring member which supports said sliding bearing.

16. The electric power steering apparatus as set forth in claim 11, wherein said resilient members are disposed in contact with a ring member provided on said bearing means and said worm, respectively.

17. The electric power steering apparatus as set forth in claim 11, wherein said worm is capable of being tilted about a portion supported by said rolling bearing, and pushing means for pushing said worm toward said worm wheel is further provided.

* * * * *